(12) United States Patent
Ota

(10) Patent No.: US 10,816,682 B2
(45) Date of Patent: Oct. 27, 2020

(54) RADIATION POSITION DETECTOR AND PET DEVICE

(71) Applicant: HAMAMATSU PHOTONICS K.K., Hamamatsu-shi, Shizuoka (JP)

(72) Inventor: Ryosuke Ota, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/344,458

(22) PCT Filed: Oct. 27, 2017

(86) PCT No.: PCT/JP2017/038976
§ 371 (c)(1),
(2) Date: Apr. 24, 2019

(87) PCT Pub. No.: WO2018/079735
PCT Pub. Date: May 3, 2018

(65) Prior Publication Data
US 2019/0324161 A1 Oct. 24, 2019

(30) Foreign Application Priority Data
Oct. 28, 2016 (JP) .................. 2016-211954

(51) Int. Cl.
*G01T 1/29* (2006.01)
*G01N 23/04* (2018.01)
(Continued)

(52) U.S. Cl.
CPC ........... *G01T 1/2985* (2013.01); *G01N 23/04* (2013.01); *G01T 1/208* (2013.01); *G01T 1/22* (2013.01); *G01T 1/363* (2013.01)

(58) Field of Classification Search
None
See application file for complete search history.

(56) References Cited

U.S. PATENT DOCUMENTS

2009/0218495 A1* 9/2009 Leroux .................. G01T 1/169
250/362
2011/0163236 A1* 7/2011 Arodzero ............... G01N 23/04
250/361 R
(Continued)

FOREIGN PATENT DOCUMENTS

JP H10-153663 A 6/1998
JP 2012-521249 A 9/2012
(Continued)

OTHER PUBLICATIONS

Brunner, S.E. et al., "Studies on the Cherenkov Effect for Improved Time Resolution of TOF-PET," IEEE Transactions on Nuclear Science, Feb. 6, 2014, vol. 61, No. 1, pp. 443-447.
(Continued)

*Primary Examiner* — Edwin C Gunberg
(74) *Attorney, Agent, or Firm* — Faegre Drinker Biddle & Reath LLP

(57) ABSTRACT

A radiation position detector includes a radiator including a medium that generates light in a first wavelength region and light in a second wavelength region by interacting with incident radiation, a first photodetector that includes a plurality of first two-dimensionally arranged pixels and detects the light in the first wavelength region, and a second photodetector that includes a plurality of second two-dimensionally arranged pixels and detects the light in the second wavelength region.

9 Claims, 13 Drawing Sheets

(51) Int. Cl.
*G01T 1/208* (2006.01)
*G01T 1/22* (2006.01)
*G01T 1/36* (2006.01)

(56) References Cited

U.S. PATENT DOCUMENTS

2011/0220802 A1* 9/2011 Frisch .................. G01T 1/2928
250/363.03
2015/0338545 A1 11/2015 Arodzero et al.

FOREIGN PATENT DOCUMENTS

| WO | WO-2009/125480 A1 | 10/2009 | |
|----|-------------------|---------|----------|
| WO | WO-2010085150 A1 * | 7/2010 | G01T 1/2985 |
| WO | WO-2010/109355 A1 | 9/2010 | |
| WO | WO-2017/175764 A1 | 10/2017 | |

OTHER PUBLICATIONS

Korpar, S. et al., "Study of TOF PET using Cherenkov light," Nuclear Instruments and Methods in Physics Research A, Oct. 21, 2011, vol. 654, pp. 532-538.

Kwon, Sun II et al., "Bismuth germanate coupled to near ultraviolet silicon photomultipliers for time-of-flight PET," Physics in Medicine & Biology, 2016, 61, pp. 38-47.

Lebedev, S. et al., "Ring Recognition in the CBM Rich Detector," Joint Institute for Nuclear Research, 2007, vol. 39, issue 45, pp. 1-20.

Shiozawa, M., "Reconstruction algorithms in the Super-Kamiokande large water Cherenkov detector," Nuclear Instruments & Methods in Physics Research Section A, Aug. 21, 1999, vol. 433, Issue 1-2, pp. 240-246.

International Preliminary Report on Patentability dated May 9, 2019 for PCT/JP2017/038976.

* cited by examiner

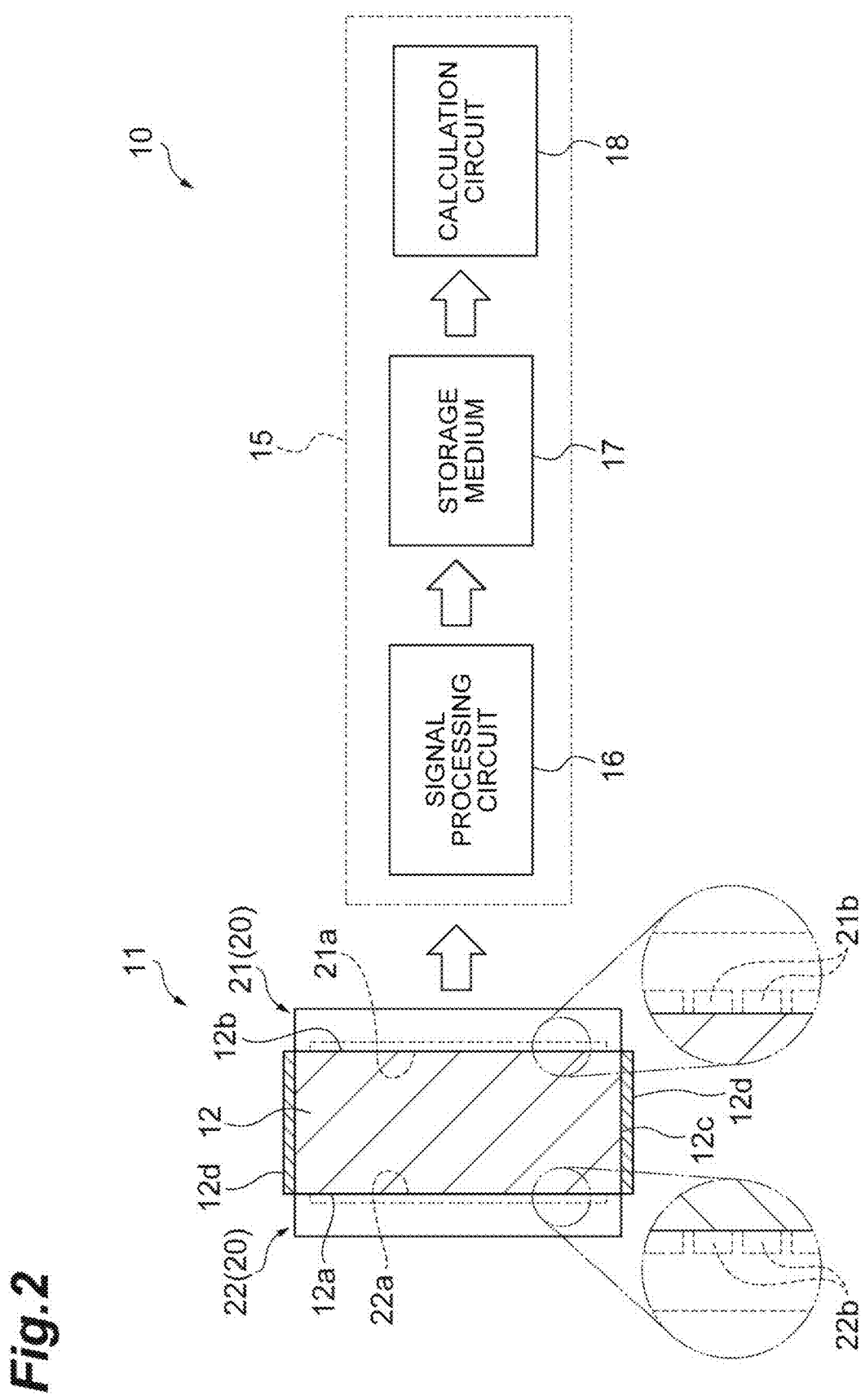

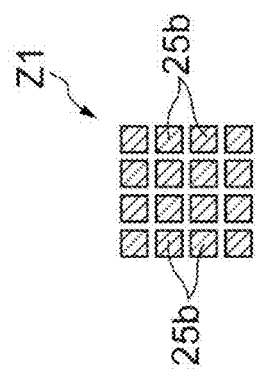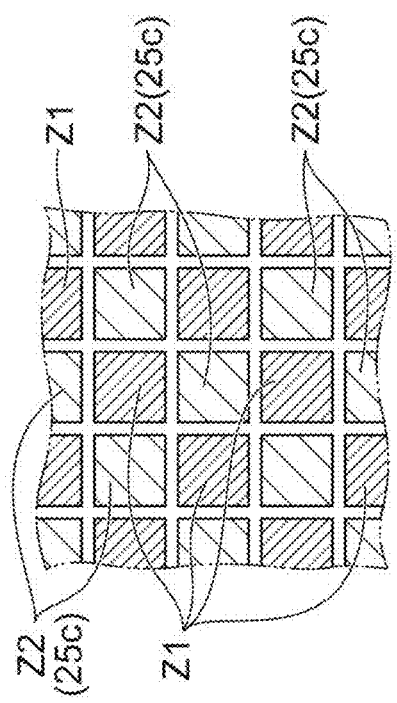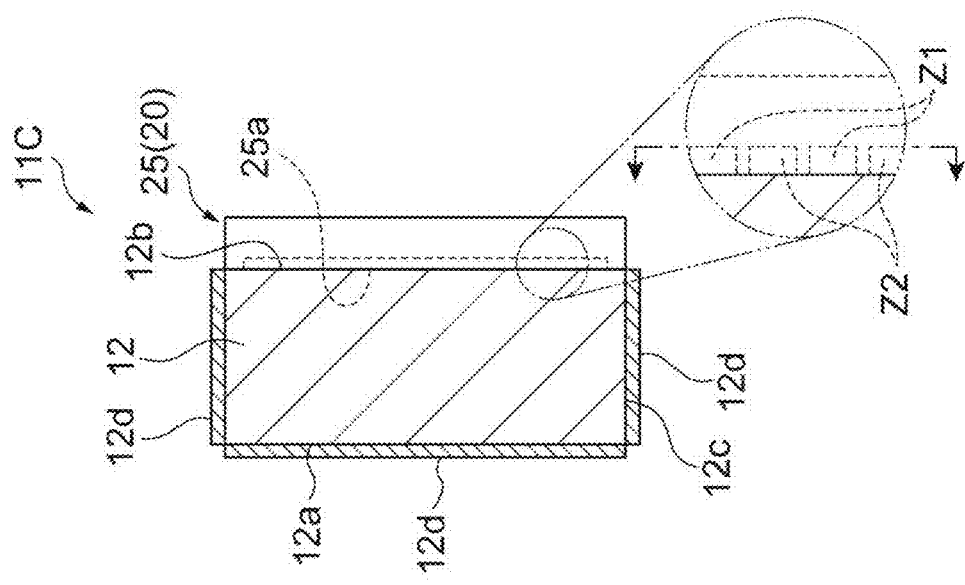

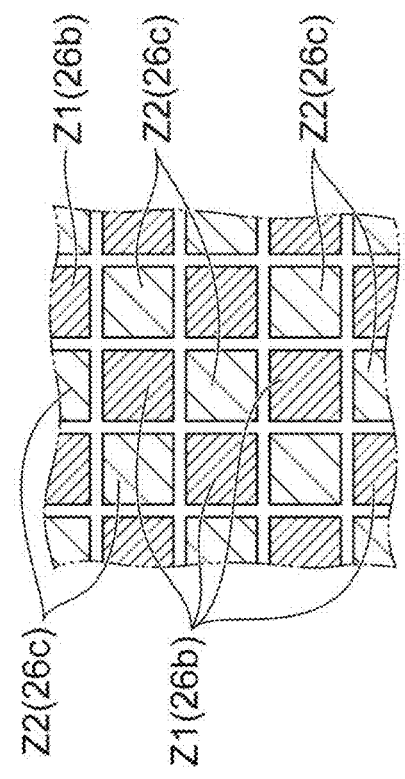
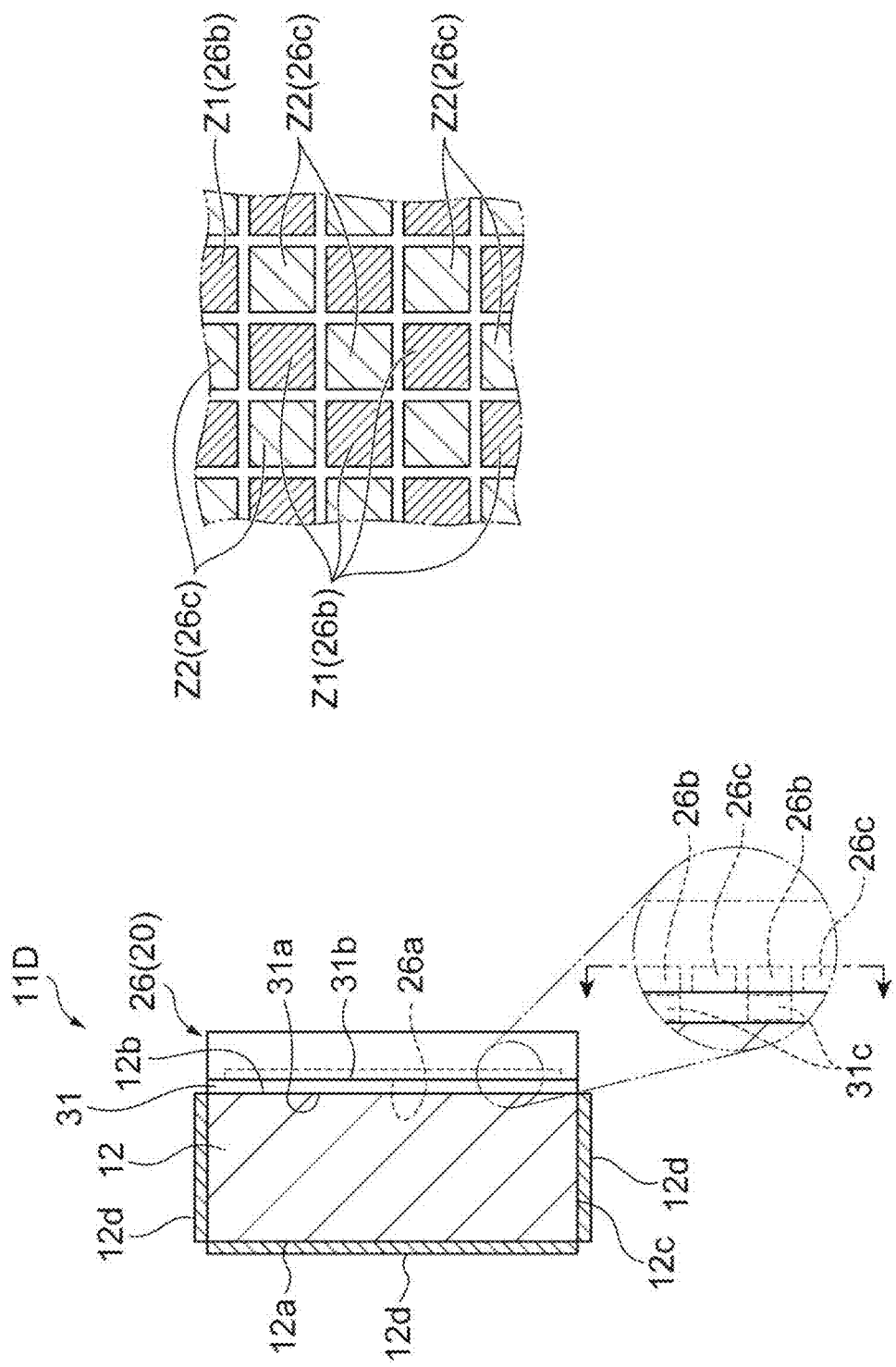

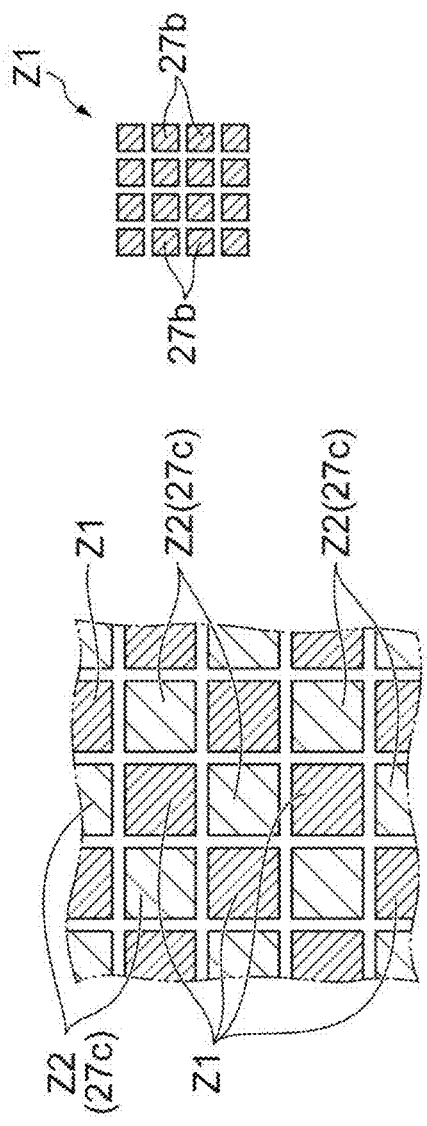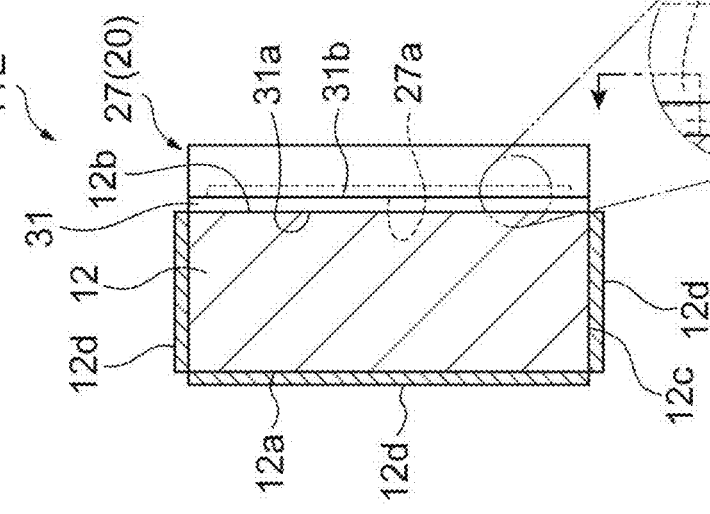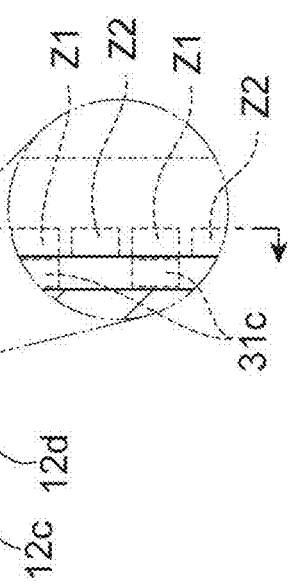

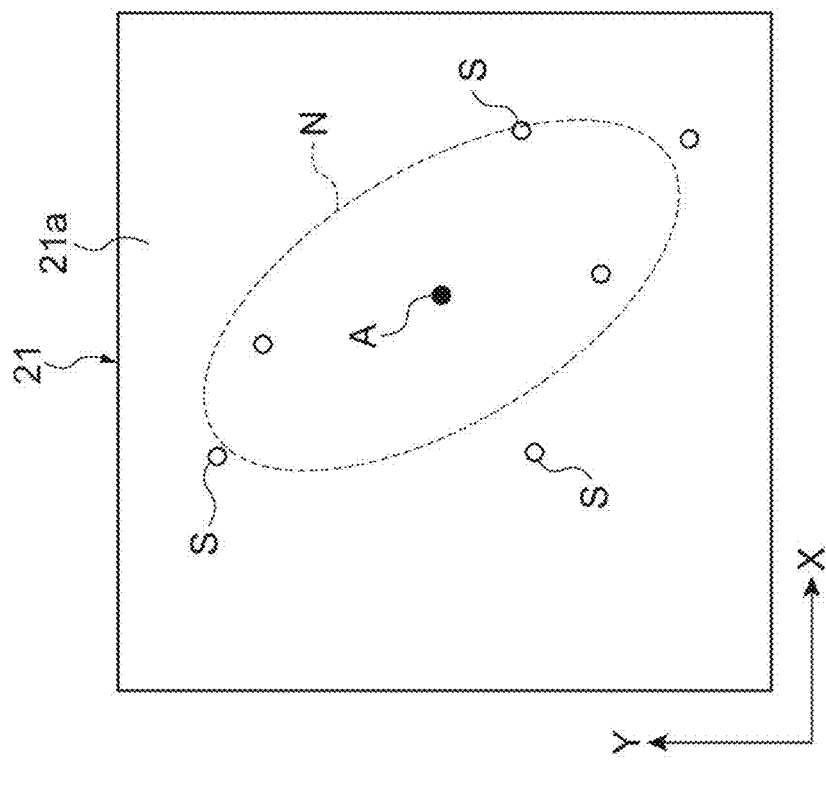
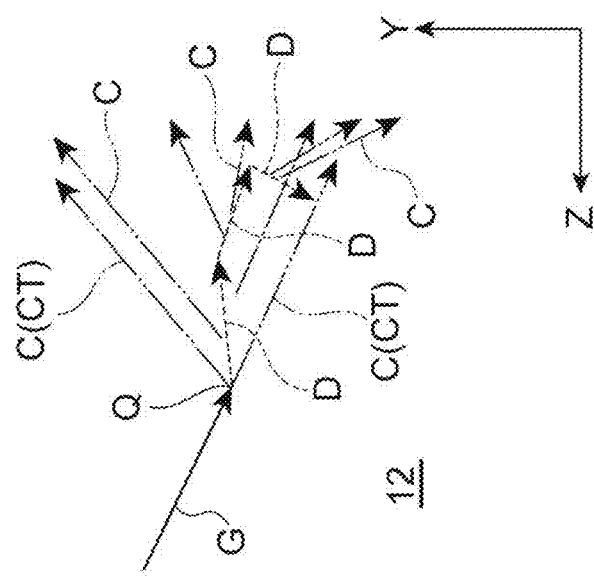

RADIATION POSITION DETECTOR AND PET DEVICE

TECHNICAL FIELD

The present disclosure relates to a radiation position detector and a PET device.

BACKGROUND ART

Non-Patent Document 1 discloses a device that detects Cherenkov light emitted by photoelectrons with a silicon photomultiplier using bismuth germanate (BGO) as a scintillator.

Non-Patent Document 2 discloses a TOF-PET device using Cherenkov light. In this device, a segment in which radiation has interacted is determined with high temporal resolution by detecting Cherenkov light generated by a radiator divided into segments.

CITATION LIST

Non-Patent Literature

[Non-Patent Document 1] Sun K et al., "Bismuth germanate coupled to near ultraviolet silicon photomultipliers for time-of-flight PET", Phys. Med. Biol. P. 61 L38-47, 2016

[Non-Patent Document 2] S. Korpar et al., "Study of TOF PET using Cherenkov light", Nucl. Instrum. Methods Phys. Res. Sect. A, vol. 654, pp. 532-538, 2011

SUMMARY OF INVENTION

Technical Problem

In techniques described in Non-Patent Document 1 and Non-Patent Document 2, the scintillator or the radiator is divided into a plurality of segments to determine an interaction position at which photoelectrons are emitted. Therefore, spatial resolution is limited by the scintillator segments.

An objective of the present disclosure is to provide a radiation position detector and a PET device capable of accurately specifying a position and a time at which a radiation interacts with a medium in a radiator.

Solution to Problem

A radiation position detector according to an aspect of the present disclosure and a PET device according to another aspect of the present disclosure include a radiator including a medium that generates light in a first wavelength region and light in a second wavelength region by interacting with incident radiation; a first photodetector that includes a plurality of first two-dimensionally arranged pixels and detects the light in the first wavelength region; and a second photodetector that includes a plurality of second two-dimensionally arranged pixels and detects the light in the second wavelength region.

In the radiation position detector and the PET device, when the radiation is incident on the radiator, the incident radiation interacts with the medium, thereby generating the light in the first wavelength region and the light in the second wavelength region. The generated light in the first wavelength region and the generated light in the second wavelength region are detected by the first photodetector and the second photodetector, respectively. Accordingly, for example, when a position and a time at which the radiation has interacted with the medium in the radiator are obtained based on a detection signal of the light in the first wavelength region, a position and a time at which the radiation has interacted with the medium in the radiator can be obtained only for the incidence of the necessary radiation by obtaining an energy of the light in the second wavelength region based on a detection signal of the light in the second wavelength region. Therefore, according to the radiation position detector and the PET device, it is possible to accurately specify the position and time at which the radiation has interacted with the medium in the radiator.

Further, the radiator may include a first surface and a second surface that face each other, a plurality of first pixels may be disposed along the first surface, and a plurality of second pixels may be disposed along the second surface. Thus, it is possible to simplify respective configurations of the first photodetector and the second photodetector.

Further, the plurality of first pixels and the plurality of second pixels may be disposed along a predetermined surface of the radiator such that a first pixel zone including at least one of the first pixels and a second pixel zone including at least one of the second pixels are alternately arranged. Accordingly, since the first photodetector and the second photodetector are aggregated on one side of the radiator, it is possible to simplify, for example, handling of wirings.

Further, the light in the first wavelength region may be Cherenkov light, and the light in the second wavelength region may be scintillation light. Accordingly, when a position and a time at which the radiation has interacted with the medium in the radiator are obtained based on a detection signal of the Cherenkov light, a position and a time at which the radiation has interacted with the medium in the radiator can be accurately obtained only for the incidence of the necessary radiation by obtaining an energy of the scintillation light based on a detection signal of the scintillation light.

Further, the radiation position detector may further include a control unit configured to acquire position information of the plurality of first pixels that have detected the Cherenkov light and time information thereof based on a signal output from the first photodetector, obtain a generation position and time of the Cherenkov light in the radiator based on the acquired position information, the acquired time information, and a propagation locus of the Cherenkov light in the radiator, and obtain an energy of the scintillation light based on a signal output from the second photodetector. The Cherenkov light propagates in one direction inside the radiator because of its high directivity. Therefore, the propagation locus of the Cherenkov light is traced from the positional information of the plurality of first pixels that have detected the Cherenkov light, the time information thereof, and the propagation locus of the Cherenkov light, such that the generation position and the time of the Cherenkov light can be obtained. It is assumed that the generation position is substantially the same as the generation position of the photoelectron, that is, the interaction position of the radiation. Therefore, it is possible to accurately specify the position and the time at which the radiation has interacted with the medium in the radiator from the obtained generation position of the Cherenkov light.

Further, the control unit may obtain the generation position of the Cherenkov light using the propagation locus of the Cherenkov light when photoelectrons are emitted from a K shell of an atom which most easily causes a photoelectric effect among atoms constituting the medium. An emission angle of the Cherenkov light is determined based on a refractive index of the medium, the energy of the radiation interacting with the medium, and a binding energy of the K shell of the atom that has emitted the photoelectrons. Therefore, it becomes unnecessary to consider a plurality of emission angles of the Cherenkov light by assuming that the photoelectrons are emitted from the K shell of the atom which most easily causes the photoelectric effect.

Further, the propagation locus of the Cherenkov light may have a conical shape centered on a locus of photoelectrons emitted by the radiation interacting with the medium, and the generation position of the Cherenkov light may be a position of an apex of the conical shape. It is possible to uniquely determine the position at which the radiation interacts with the medium in the radiator by obtaining the generation position of the Cherenkov light as the position of the apex of the conical shape.

Further, the control unit may obtain the position of the apex of the conical shape based on ellipse information on an ellipse to be fitted to the plurality of first pixels that have detected the Cherenkov light. The Cherenkov light spreads in a conical shape centered on a traveling locus of photoelectrons. Thus, when photoelectrons travel at an angle with respect to the photodetector, the positions indicated by the plurality of pieces of detected position information are disposed on a locus of the ellipse. Therefore, it is possible to obtain the position of the apex of the conical shape more accurately by using information on an ellipse that is fitted to a plurality of first pixels that has actually detected the Cherenkov light.

Effects of Invention

With the radiation position detector according to an aspect of the present disclosure and the PET device according to another aspect of the present disclosure, it is possible to accurately specify the position and the time at which the radiation interacts with the medium in the radiator.

BRIEF DESCRIPTION OF DRAWINGS

FIG. 2 is a configuration diagram of a radiation position detector according to the first embodiment.

FIG. 9A is a configuration diagram of a radiation position detector according to a fourth embodiment.

FIG. 9B is a configuration diagram of a radiation position detector according to a fourth embodiment.

FIG. 9C is a configuration diagram of a radiation position detector according to a fourth embodiment.

FIG. 10A is a configuration diagram of a radiation position detector according to a fifth embodiment.

FIG. 10B is a configuration diagram of a radiation position detector according to a fifth embodiment.

FIG. 11A is a configuration diagram of a radiation position detector according to a sixth embodiment.

FIG. 11B is a configuration diagram of a radiation position detector according to a sixth embodiment.

FIG. 11C is a configuration diagram of a radiation position detector according to a sixth embodiment.

FIG. 12A is a schematic diagram illustrating another aspect of Cherenkov light that is emitted in a medium.

FIG. 12B is a schematic diagram illustrating another aspect of Cherenkov light that is emitted in a medium.

DESCRIPTION OF EMBODIMENTS

Figure 1B:
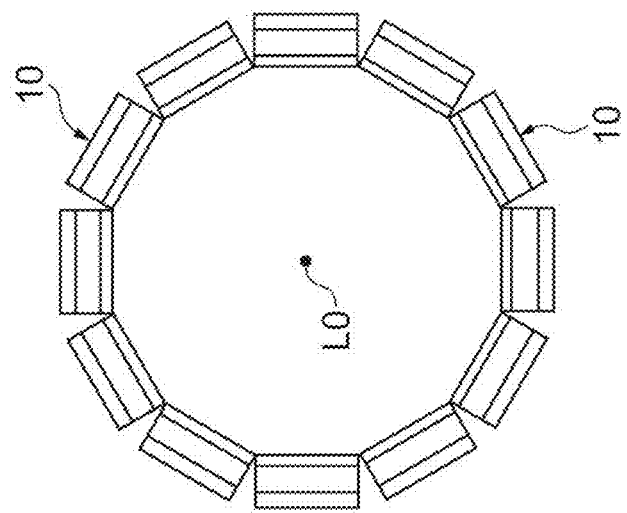
FIG. 1B is a sectional view of a detector ring in the PET device.

Hereinafter, embodiments of the present disclosure will be described in detail with reference to the drawings. For convenience, substantially the same elements are denoted by the same reference numerals, and description thereof may be omitted.

First Embodiment

Figure 1A:
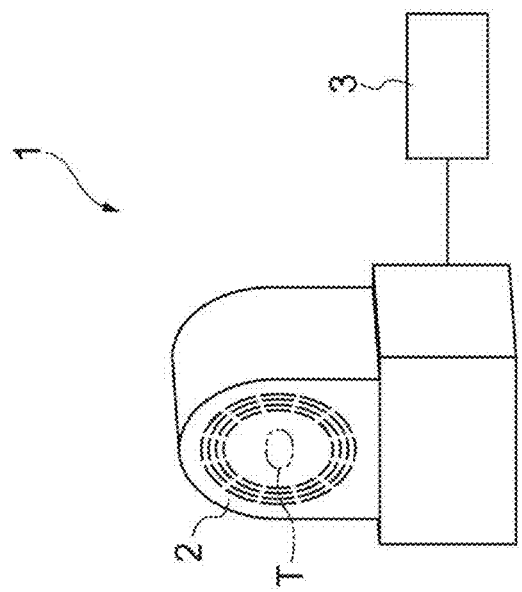
FIG. 1A is a schematic view of a PET device according to a first embodiment.

FIG. 1A is a schematic diagram of a positron emission tomography (PET) device of a first embodiment. FIG. 1B is a cross-sectional view of a detector ring of the PET device. As illustrated in FIG. 1A and FIG. 1B, the PET device 1 includes a bed (not illustrated) on which a subject T is placed, a gantry 2 having an opening with a circular cross-sectional shape, and an image processing unit 3 to which data detected by a detector ring within the gantry 2 is transferred. Further, in the detector ring within the gantry 2 of the PET device 1, a plurality of radiation position detectors 10 are disposed in a ring shape to come in contact with each other on a circumference having a predetermined line L0 as a center line. The PET device 1 is a device that detects γ rays (radiation) that are emitted from the subject T to which a drug labeled with a positron emitting nuclide (a radioactive isotope that emits positrons) is administered, in order to acquire a tomographic image of the subject T at a plurality of slice positions.

FIG. 2 is a block diagram illustrating a configuration of the radiation position detector 10. As illustrated in FIG. 2, the radiation position detector 10 includes a detection unit 11 including a radiator 12 and a photodetector 20, and a control unit 15 including a signal processing circuit 16, a storage medium 17, and a position calculation circuit 18. The photodetector 20 includes a first photodetector 21 and a second photodetector 22. The radiation position detector 10 three-dimensionally determines a position at which the γ rays emitted from the subject T interact with a medium in the radiator 12.

The radiator 12 has a flat plate shape including a front surface (a second surface) 12a and a back surface (a first surface) 12b facing each other, and a side surface 12c connecting the front surface 12a to the back surface 12b. For example, γ-rays are incident on the radiator 12 from the front surface 12a side. It should be noted that in the PET device 1, each of the radiators 12 of the plurality of radiation position detectors 10 is disposed so that the front surface 12a side thereof is directed to the predetermined line L0.

The radiator 12 interacts with the incident γ-rays to generate Cherenkov light as light in a first wavelength region and scintillation light as light in a second wavelength region. The first wavelength region and the second wavelength region may have a relationship in which at least a central wavelength of the first wavelength region and a central wavelength of the second wavelength region are different from each other, but the first wavelength region and the second wavelength region may have a relationship in which the entire first wavelength region and the entire second wavelength region do not overlap each other. For example, when the radiator 12 is formed using a medium such as a BGO, a wavelength region of Cherenkov light (that is, the first wavelength region) is an ultraviolet region (250 nm or more), and a wavelength region of scintillation light (that is, the second wavelength region) is a visible region (350 nm or more).

A light absorption layer 12d that absorbs the Cherenkov light generated inside the radiator 12 is provided on the side surface 12c which is an outer surface other than the front surface 12a and the back surface 12b of the radiator 12. The light absorption layer 12d is, for example, a black tape adhered to the side surface 12c. The light absorption layer 12d may be a black coating film with which the side surface 12c has been coated. The light absorption layer 12d may absorb light other than the Cherenkov light.

The first photodetector 21 is provided on the back surface 12b of the radiator 12, and detects the Cherenkov light generated inside the radiator 12. The first photodetector 21 includes a detection surface 21a in which a plurality of pixels (first pixels) 21b that perform photoelectric conversion are arranged two-dimensionally. The plurality of pixels 21b are disposed to correspond to the back surface 12b of the radiator 12. More specifically, the first photodetector 21 is coupled to the radiator 12 so that the back surface 12b and the detection surface 21a face each other. Each of these pixels 21b can hold a segment address that is a part of position information of the pixel 21b on the detection surface 21a, and a detection time when the Cherenkov light has been detected at the segment address. The detection time is time information acquired based on a signal output from the first photodetector 21. The first photodetector 21 outputs the segment address, and the time information indicating the detection time, to the control unit 15 as list data. Each pixel 21b may be constituted by, for example, a single photon avalanche diode (SPAD).

The first photodetector 21 has, for example, a sensitivity only to the light in the first wavelength region, and detects only the Cherenkov light without detecting the scintillation light. In this case, it is unnecessary for a filter that cuts light in a wavelength region other than the first wavelength region to be provided in the first photodetector 21.

The second photodetector 22 is provided on the front surface 12a of the radiator 12 to detect the scintillation light generated in the radiator 12. The second photodetector 22 includes the detection surface 22a on which a plurality of pixels (second pixels) 22b performing photoelectric conversion are arranged two-dimensionally. The plurality of pixels 22b are arranged to correspond to the front surface 12a of the radiator 12. More specifically, the second photodetector 22 is coupled to the radiator 12 so that the front surface 12a and the detection surface 22a face each other. Each pixel 22b can hold a segment address which is a part of position information of the pixel 22b on the detection surface 22a, a detection time at which the scintillation light has been detected at the segment address, and an energy (amount of light) of scintillation light detected at the segment address. The detection time is time information that is acquired based on the signal output from the second photodetector 22. The second photodetector 22 outputs the segment address, the time information indicating the detection time, and an energy of the scintillation light, to the control unit 15 as list data. The energy of the scintillation light is obtained, for example, based on the amount of light (the number of photons) of the scintillation light in the pixel 22b that has detected the scintillation light. Each pixel 22b may include, for example, a single photon avalanche diode (SPAD).

The second photodetector 22 has, for example, a sensitivity only to the light in the second wavelength region, and detects only the scintillation light without detecting the Cherenkov light. In this case, it is unnecessary for a filter that cuts light in a wavelength region other than the second wavelength region to be provided in the second photodetector 22.

Figure 3B:
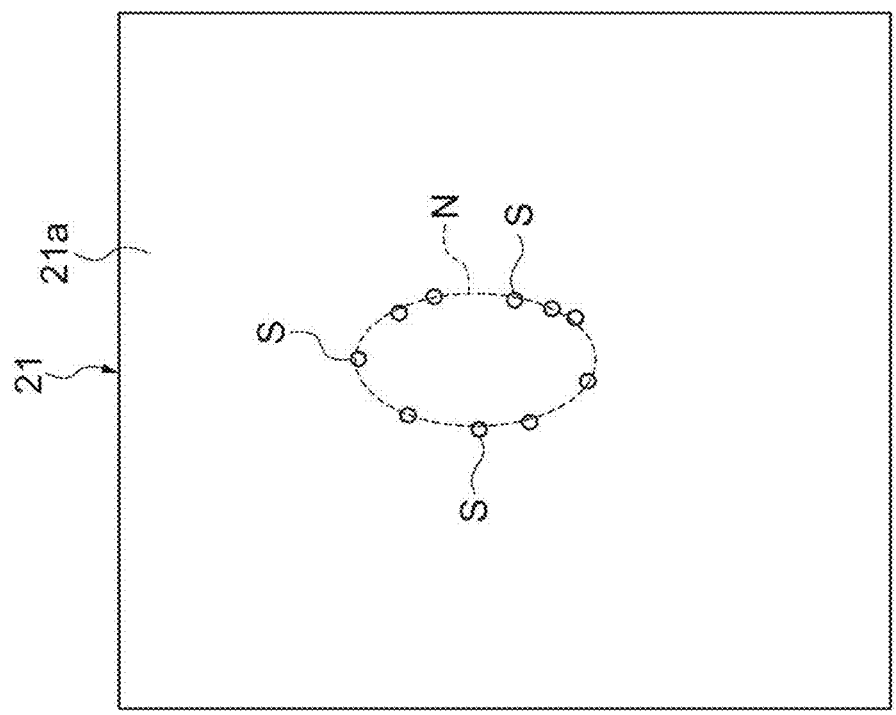
FIG. 3B is a schematic diagram illustrating Cherenkov light and scintillation light that are emitted in a medium.
Figure 3A:
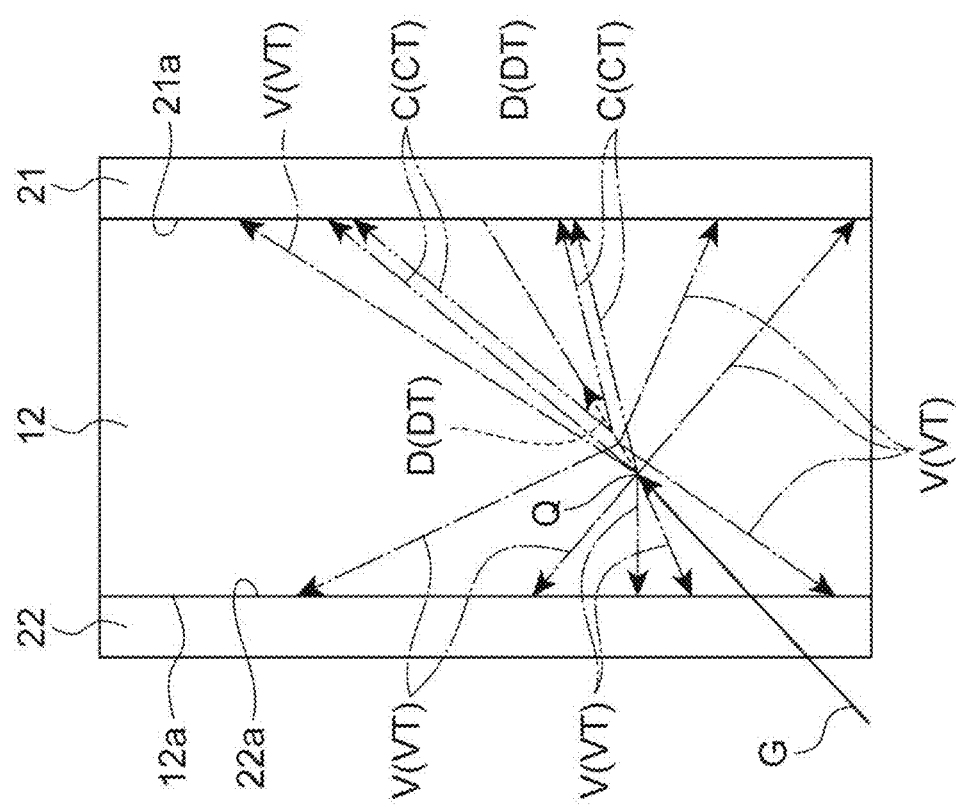
FIG. 3A is a schematic diagram illustrating Cherenkov light and scintillation light that are emitted in a medium.

FIG. 3A and FIG. 3B are schematic diagrams illustrating Cherenkov light and scintillation light emitted inside the radiator 12.

FIG. 3A schematically illustrates the radiator 12 and the photodetector 20 in a cross-sectional view, and FIG. 3B schematically illustrates the photodetector 20 in a plan view. As illustrated in FIG. 3A, when γ-rays G are incident on the radiator 12 from the front surface 12a side, the γ-rays G interact inside the radiator 12 and a photoelectron D is emitted. Cherenkov light C and scintillation light V are emitted inside the radiator 12 due to the photoelectron D. A propagation locus CT of the Cherenkov light C has a conical shape centered on a traveling locus (locus) DT of the photoelectron D. When the traveling locus DT of the photoelectron D is inclined with respect to the detection surface 21a, a contour of positions S of the pixel 21b that detects the Cherenkov light C forms an ellipse N, as illustrated in FIG. 3B. As the photoelectron D travels inside the radiator 12, the interaction of the photoelectrons D inside the radiator 12 is repeated. Accordingly, the Cherenkov light C and the scintillation light V are emitted as the photoelectron D travels inside the radiator 12. The scintillation light V is emitted isotropically from the interaction positions of the photoelectron D inside the radiator 12.

As illustrated in FIG. 2, the control unit 15 is configured to acquire the position information and the time information of the plurality of pixels 21b that have detected the Cherenkov light C based on a signal output from the first photodetector 21. The control unit 15 is configured to obtain a generation position Q of the Cherenkov light C based on the acquired position information, the acquired time information, and the propagation locus CT of the Cherenkov light C in the radiator 12. Further, the control unit 15 is configured to obtain an energy (amount of light) of the scintillation light V based on a signal output from the second photodetector 22.

The signal processing circuit 16 acquires a plurality of pieces of list data from the first photodetector 21 and sorts the acquired pieces of list data based on the time information. Further, the signal processing circuit 16 determines whether or not the acquired list data is valid. When it is determined that the list data is valid, the signal processing circuit 16 stores the list data in the storage medium 17. The validity of the list data is determined based on whether or not a sum of energies of the scintillation light V in the pieces of list data of the pixels 22b that have detected the scintillation light V emitted due to the same γ-ray G is equal to or greater than a predetermined value. For example, it is possible to determine the validity of the list data based on whether or not the sum of the energies of the scintillation light V in the pieces of list data falling within a time window having a predetermined time width is equal to or greater than a predetermined value. In this case, the time width of the time window is set so that only the pixels 22b that have detected the scintillation light V at the same time fall within the time window. The time width of the time window is, for example, 10 ns.

The calculation circuit 18 acquires a plurality of pieces of list data determined to be valid by the signal processing circuit 16 from the storage medium 17. Based on the propagation locus of the Cherenkov light in the radiator 12, the generation position of Cherenkov light C is calculated from the plurality of pieces of list data. The calculation circuit 18 is, for example, a computer including a central processing unit (CPU) in which a computing process is performed, a storage device including a memory such as a read only memory (ROM) and a random access memory (RAM), and an input and output device. Further, the calculation circuit 18 may be constituted by a field-programmable gate array (FPGA) circuit. In the calculation circuit 18, a process for specifying the generation position Q of the Cherenkov light C is executed based on a principle to be described below.

Figure 4B:
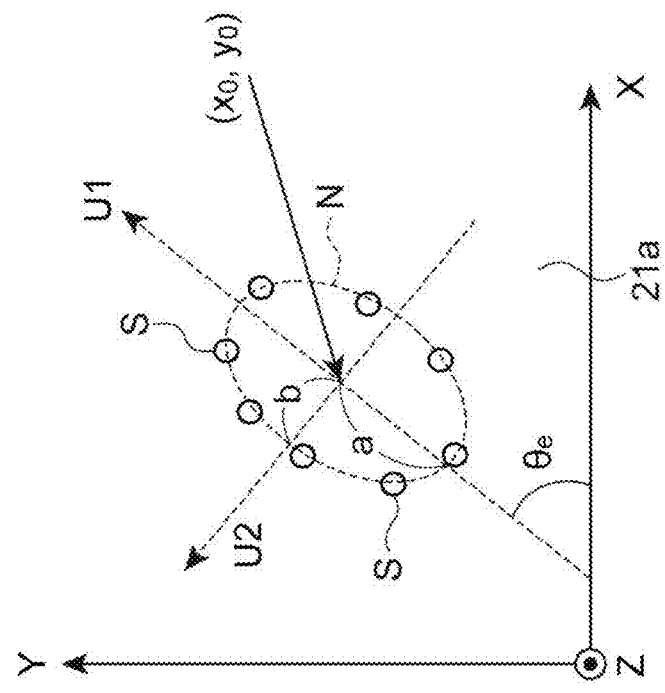
FIG. 4B is a diagram illustrating a principle of specifying an interaction position of radiation inside the medium.
Figure 4A:
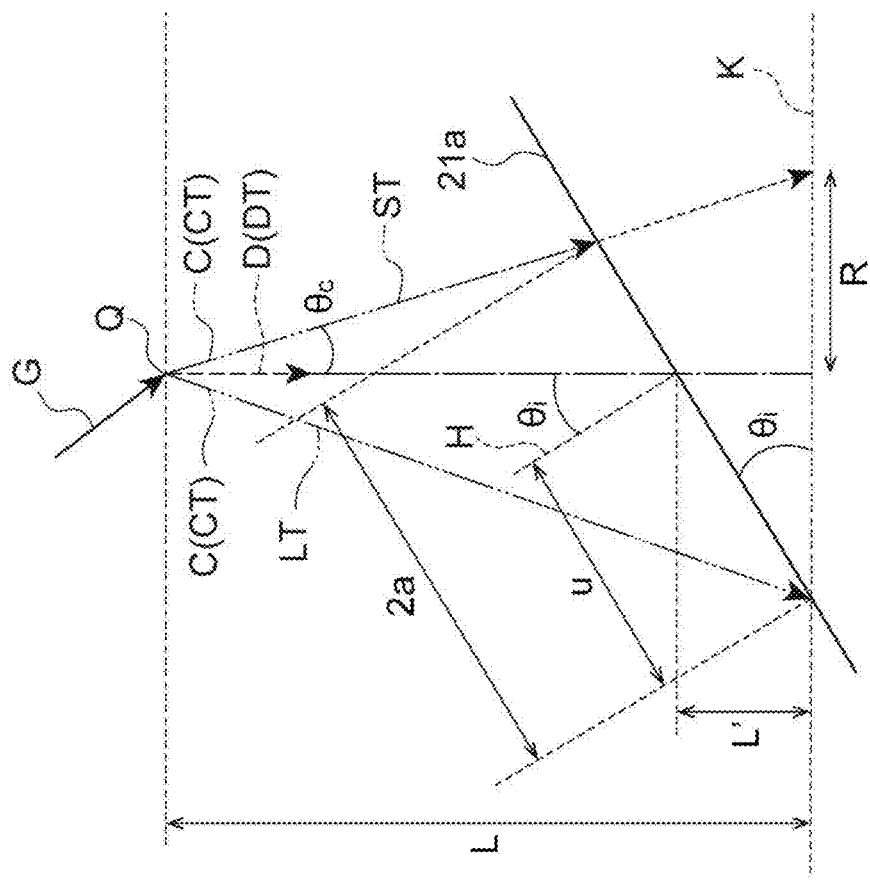
FIG. 4A is a diagram illustrating a principle of specifying an interaction position of radiation inside the medium.
Figure 5:
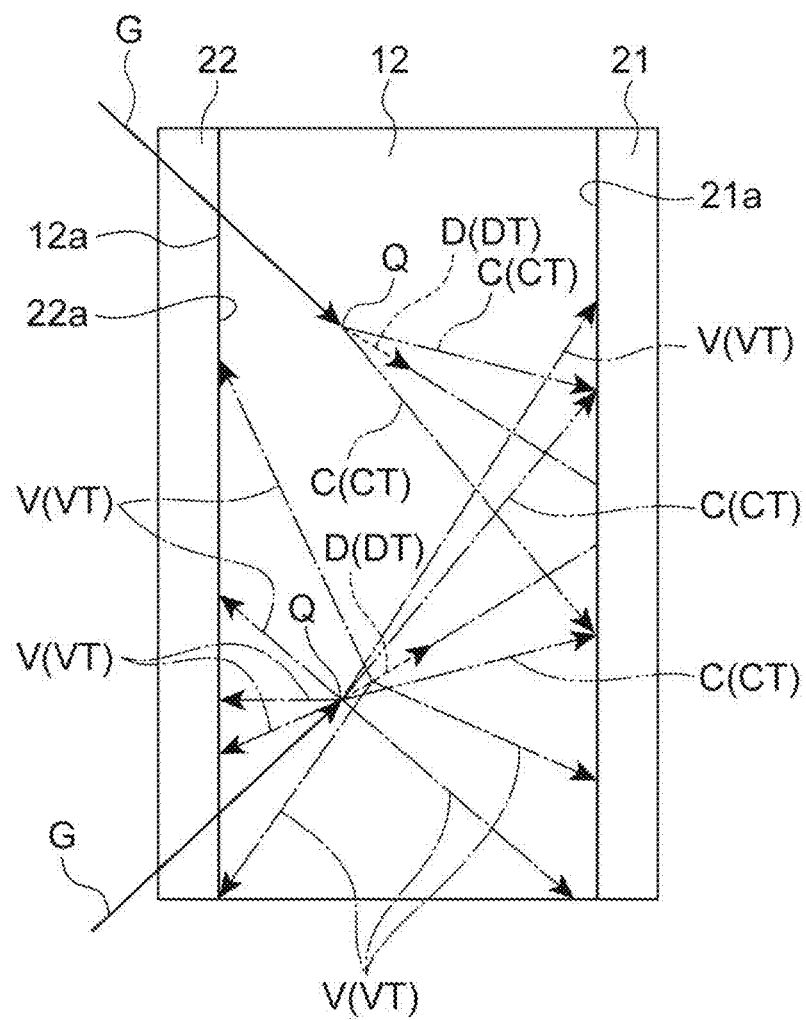
FIG. 5 is diagram illustrating the principle of specifying interaction positions of radiation inside the medium.

A principle of specifying a position in which the γ-rays G interact with the medium in the radiator 12 will be described with reference to FIG. 4A, FIG. 4B, and FIG. 5. FIG. 4A, FIG. 4B, and FIG. 5 are diagrams illustrating a principle of specifying the interaction position of γ-rays G inside the medium.

In the example of FIG. 4A, the detection surface 21a is indicated by a solid line, the traveling locus DT of the photoelectron D is indicated by a broken line, and an extension line of the traveling locus DT of the photoelectron D is indicated by an alternating one-dot dashed line. Further, the propagation locus CT of the Cherenkov light C is indicated by an alternating two-dots dashed line. Further, an angle between a normal line H of the detection surface 21a and the extension line of the traveling locus DT (an incidence angle) is $\theta_i$, and the emission angle of the Cherenkov light C is $\theta_c$. In FIG. 4A, a plane according to a major axis of an ellipse N formed by a contour of the positions of the pixels 21b of the first photodetector 21 that have detected the Cherenkov light C, and the normal line H is illustrated. In FIG. 4A, among the propagation loci CT of the Cherenkov light C, a locus having the shortest distance from the generation position Q to the detection surface 21a (hereinafter sometimes referred to as a "short side ST") and a locus having the longest distance from the generation position to the detection surface 21a (hereinafter sometimes referred to as a "long side LT") are illustrated. It should be noted that an intersection between the short side ST and the long side LT corresponds to the generation position Q, and the γ-rays G incident on the radiator 12 interact at this position.

In the example of FIG. 4B, an origin is set at an any position on the detection surface 21a of the first photodetector 21. An orthogonal coordinate system XYZ consists of an X-axis and a Y-axis set on the detection surface 21a, and a Z-axis extending to the radiator 12. In FIG. 4B, an X-Y plane is illustrated. In this case, the normal line H of the detection surface 21a of the first photodetector 21 is in a Z-axis direction.

As illustrated in FIG. 4B, the ellipse N to be fitted to the contour of the positions of the pixels 21b that have detected the Cherenkov light C has a shape obtained by cutting the propagation locus CT of the Cherenkov light C having the conical shape at the incidence angle $\theta_i$ and has a long diameter having a length of "a" and a short diameter having a length of "b". In the example of FIG. 4B, coordinates of a center point of the ellipse N are indicated by ($x_0$, $y_0$), and an angle formed between the major axis of the ellipse N and the X-axis is an angle $\theta_e$. Further, in FIG. 4B, an axis U1 along the major axis of the ellipse N and an axis U2 along the minor axis thereof are illustrated. In this case, an angle formed between the axis U1 and the X-axis is an angle $\theta_e$.

As illustrated in FIG. 4A and FIG. 4B, the Cherenkov light C draws a propagation locus CT spreading in a conical shape around a traveling locus DT of the photoelectrons D. When a refractive index of the radiator 12 is "n" and a velocity of photoelectrons in the radiator 12 is "β", an emission angle $\theta_c$ of such Cherenkov light C satisfies a relationship of Equation (1).

[Math. 1]

$$\cos\theta_c = \frac{1}{n\beta} \tag{1}$$

In the embodiment, the interaction position is calculated using the propagation locus CT of the Cherenkov light C when the photoelectrons D are emitted from the K shells of the atoms which most readily cause the photoelectric effect among the atoms constituting the radiator 12. When the energy of the incident γ rays G interacting with the medium is $E_\gamma$, the mass of the electrons is $\theta_e$, and the binding energy of the K shell of the atoms causing the photoelectric effect is $E_{B,E}$, the emission angle $\theta_c$ of the Cherenkov light C is a constant angle as shown by Equation (2). However, $E_{B,E}$ when the interaction between the γ-rays G and the medium is Compton scattering is set to zero.

[Math. 2]

$$\theta_c = a\cos\left(\frac{E_\gamma + m_e - E_{B.E.}}{n\sqrt{(E_\gamma + m_e - E_{B.E.})^2 - m_e^2}}\right) \tag{2}$$

Therefore, it is possible to specify the shape of the cone forming the propagation locus CT of the Cherenkov light C based on the segment address indicating the position of the pixels 21b that have detected the Cherenkov light C. An apex of the cone is a generation position Q of the Cherenkov light C and is substantially the same as the generation place of the photoelectrons D, that is, the interaction position of the γ rays G.

In FIG. 4A, an imaginary line perpendicular to the traveling locus DT of the photoelectrons D and passing through an intersection between the long side LT and the detection surface 21a is defined as a line K. Here, a distance from the line K to the generation position Q is set to L. Further, a distance from an intersection between an extension line of the traveling locus DT of the photoelectrons D and the line K to an intersection between the extension line of the short side ST or the long side LT and the line K is set to R. Further, a distance from an intersection between the extension line of the traveling locus DT of the photoelectron D and the detection surface 21a to the line K is set as L'. Further, a distance from an intersection between an extension line of the traveling locus DT of the photoelectrons D and the detection surface 21a to the intersection between the long side LT and the line K is set to "u". In this case, tan $\theta_c$, L', and "u" can be represented by Equations (3), (4) and (5) below, respectively.

[Math. 3]
$$\tan\theta_c = \frac{R}{L} \quad (3)$$

[Math. 4]
$$L' = R\tan\theta_i \quad (4)$$

[Math. 5]
$$u = a\frac{\tan\theta_i + \tan\left(\frac{\pi}{2} - \theta_c\right)}{\tan\left(\frac{\pi}{2} - \theta_c\right)} \quad (5)$$

Here, when P is defined as shown in Equation (6) below, a length "a" of a long diameter and a length "b" of a short diameter are represented by Equations (7) and (8), respectively.

[Math. 6]
$$P = \frac{\tan\theta_c \tan\theta_i}{1 + \tan\theta_c \tan\theta_i} \quad (6)$$

[Math. 7]
$$a = \frac{R(1-P)}{\cos\theta_i} \quad (7)$$

[Math. 8]
$$b = R \times \sqrt{1 - 2P} \quad (8)$$

A position of the apex of the conical shape obtained from the above equations, that is, coordinates (x, y, z) of the generation position Q of the Cherenkov light C are determined according to two Equations (9) and (10).

[Math. 9]
$$x = ((u-a)-(L-L')\sin\theta_i)\cos\theta_e + x_0$$
$$y = ((u-a)-(L-L')\sin\theta_i)\sin\theta_e + y_0$$
$$z = (L-L')\cos\theta_i$$

[Math. 10]
$$x = -((u-a)-(L-L')\sin\theta_i)\cos\theta_e + x_0$$
$$y = -((u-a)-(L-L')\sin\theta_i)\sin\theta_e + y_0$$
$$z = (L-L')\cos\theta_i$$

FIG. 5 schematically illustrates the radiator 12 and the photodetector 20 in a cross-sectional view. As illustrated in FIG. 5, the generation position Q determined by Equations (9) and (10) appears at two places including one side and the other side in the major axis direction of the ellipse N. Therefore, it is difficult to determine, from only a shape of the ellipse N as illustrated in FIG. 3B, which of candidates for the two generation positions Q including the one side and the other side in the major axis direction of the ellipse N is an actual generation position Q. Therefore, one of the two candidates shown in Equations (9) and (10) can be specified as the actual generation position by using the fact that the scintillation light V is emitted isotropically inside the radiator 12 and the pixels 22b of the second photodetector 22 detect the scintillation light V.

As illustrated in FIG. 5, the pixel 22b detects the scintillation light V isotropically emitted from the generation position Q. Accordingly, a uniform energy distribution according to the amount of light (the number of the photons) of the scintillation light V occurs on the detection surface 22a. The energy distribution is acquired from the position information of the pixel 22b that has detected the scintillation light and the amount of light (the number of photons) of the scintillation light V detected by the pixel 22b. Therefore, it is possible to acquire the position information and the time information thereof, and to obtain an energy distribution and a centroid position of the energy distribution based on the acquired position information and the acquired time information. Distances from the centroid position to the generation positions Q of the two candidates shown in Equations (9) and (10) may be compared with each other, and the candidate having the shorter distance may be determined to be the generation position Q of the Cherenkov light C. In this case, the generation position Q is the generation position of the photoelectron D and is substantially the same position as the interaction position of the γ-rays G.

Figure 6:
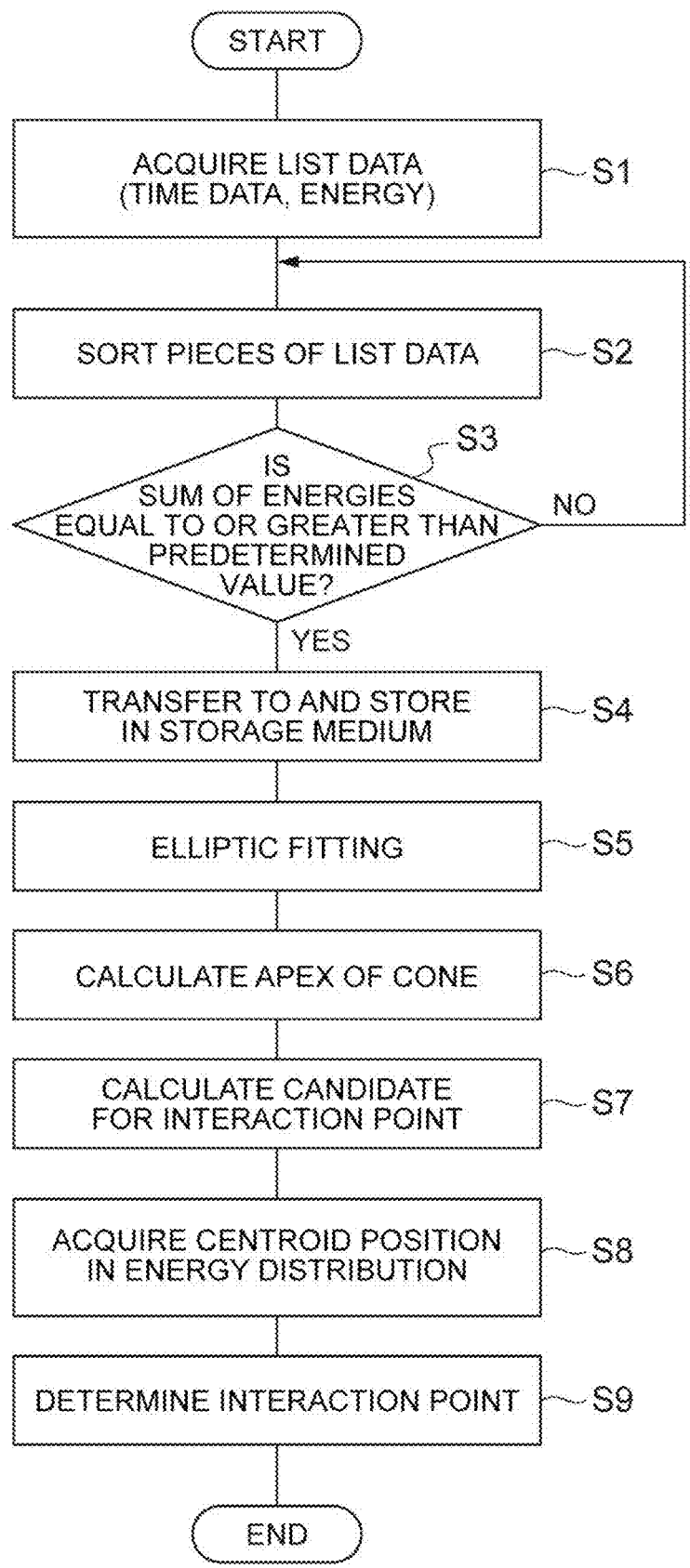
FIG. 6 is a flowchart illustrating a process of a control unit.

Next, a process flow of the control unit 15 will be described. FIG. 6 is a flowchart illustrating a process of the control unit 15. First, the signal processing circuit 16 acquires the list data output from each pixel 21b of the first photodetector 21 and the pixel 22b of the second photodetector 22 (step S1). The list data includes time information indicating a time at which the pixel 21b has detected the Cherenkov light C, a segment address indicating a position of the pixel 21b, time information indicating a time at which the pixel 22b has detected the scintillation light V, a segment address indicating a position of the pixel 22b, and the information on the amount of the scintillation light V. The signal processing circuit 16 obtains the energy of the scintillation light V based on the acquired information on the amount of the scintillation light V.

The signal processing circuit 16 sorts the acquired plurality of pieces of list data based on the time information (step S2). The signal processing circuit 16 acquires the list data group that falls within the time window from the sorted list data, and determines whether a sum of energies of the scintillation light V in the pieces of list data constituting the acquired list data group is equal to or greater than a predetermined value (step S3). That is, the signal processing circuit 16 executes energy discrimination. In this case, a difference between the pieces of time information of the respective pieces of list data constituting the list data group falls within the time width of the time window. When the sum of energies of the scintillation light V in the pieces of list data constituting the list data group is equal to or greater than the predetermined value in step S3, these pieces of list data are transferred to the storage medium 17 and stored in the storage medium 17 (step S4). When the sum of energies of the scintillation light V in the pieces of list data constituting the list data group is smaller than the predetermined value, these pieces of list data are processed as invalid data. In this case, the generation position Q of the Cherenkov light C is not obtained. For example, the predetermined value in step S3 may be a value of an energy with which events can be removed, the events such as inter-crystal scattering and intra-subject scattering, which become noise components when the pixel 21b detects the Cherenkov light C. In addition, the list data may be determined to be invalid data when the sum of the energies of the scintillation light V is smaller than an energy corresponding to a case in which the interaction is a photoelectric effect (for example, when the interaction is Compton scattering).

Subsequently, elliptic fitting based on the list data group stored in the storage medium 17 is performed by the calculation circuit 18 (step S5). That is, the calculation circuit 18 derives an ellipse to be fitted to the positions indicated by the segment addresses of the respective pieces of list data constituting the list data group. In the elliptical fitting, information on the ellipse (ellipse information) can be obtained, for example, by approximation using robust estimation. The calculation circuit 18 acquires coordinates of a center ($x_0$, $y_0$) of the ellipse, a length "a" of a long diameter, a length "b" of a short diameter, and an angle $\theta_e$ between a major axis of the ellipse N and an X-axis from the derived information of the ellipse.

The calculation circuit 18 calculates coordinates of the apex of the cone based on the above determination principle, using the acquired information on the ellipse (step S6), and outputs a position of the coordinates as a candidate for an interaction point (an interaction position) (step S7). The calculation circuit 18 acquires a centroid position in the energy distribution based on the above determination principle (step S8). The calculation circuit 18 determines a candidate of the interaction point in an area in which there is the centroid position of the energy distribution to be a candidate for an actual interaction point (a generation position of the Cherenkov light) (step S9). When the coordinate information of the interaction point and the detected time information are transferred to the image processing unit 3, a tomographic image is generated in the image processing unit 3 in the PET device 1.

In the radiation position detector 10 and the PET device 1 described above, when the γ-rays G are incident on the radiator 12, the incident γ-rays G interact with the medium, thereby generating the light in the first wavelength region and the light in the second wavelength region, and the generated light in the first wavelength region and the generated light in the second wavelength region are detected by the first photodetector 21 and the second photodetector 22, respectively. Accordingly, for example, when the position and the time at which the γ-rays G have interacted with the medium in the radiator 12 are obtained based on the detection signal of the light in the first wavelength region, the position and the time at which the γ-rays G have interacted with the medium in the radiator 12 can be obtained only for the incidence of the necessary γ-rays G by obtaining the energy of the light in the second wavelength region based on the detection signal of the light in the second wavelength region. Therefore, according to the radiation position detector 10 and the PET device 1, it is possible to accurately specify the position and time at which the γ-rays G have interacted with the medium in the radiator 12.

In the radiation position detector 10 and the PET device 1, the radiator 12 includes the front surface 12a (the second surface) and the back surface 12b (the first surface) that face each other. The plurality of pixels 21b are disposed along the back surface 12b, and the plurality of pixels 22b are disposed along the front surface 12a. Thus, it is possible to simplify the respective configurations of the first photodetector 21 and the second photodetector 22.

In the radiation position detector 10 and the PET device 1, the light in the first wavelength region is the Cherenkov light C, and the light in the second wavelength region is the scintillation light V. Accordingly, when the position and the time at which the γ-rays G have interacted with the medium in the radiator 12 are obtained based on the detection signal of the Cherenkov light C, the energy of the scintillation light V is obtained based on the detection signal of the scintillation light V, such that the position and the time at which the γ-rays G have interacted with the medium in the radiator 12 can be accurately obtained only for the incidence of the necessary γ-rays G.

The radiation position detector 10 and the PET device 1 further include the control unit 15. The control unit 15 acquires the position information of the plurality of pixels 21b that have detected the Cherenkov light C and the time information thereof based on the signal output from the first photodetector 21, obtains the generation position Q of the Cherenkov light C in the radiator 12 based on the acquired position information, the acquired time information, and the propagation locus CT of the Cherenkov light C in the radiator 12, and obtains the energy of the scintillation light V based on the signal output from the second photodetector 22. The Cherenkov light C propagates in one direction inside the radiator 12 because of its high directivity. Therefore, the propagation locus CT of the Cherenkov light C is traced from the positional information of the plurality of pixels 21b that have detected the Cherenkov light C, the time information thereof, and the propagation locus CT of the Cherenkov light C, such that the generation position Q and the time of the Cherenkov light C can be obtained. It is assumed that the generation position Q is substantially the same as the generation position of the photoelectron D, that is, the interaction position of the γ-rays G. Therefore, it is possible to accurately specify the position and the time at which the γ-rays G have interacted with the medium in the radiator 12 from the obtained generation position Q of the Cherenkov light C.

It should be noted that when the energy of the scintillation light V is smaller than a certain value, the Cherenkov light C detected by the pixels 21b can include a noise component due to an event such as inter-crystal scattering and intra-subject scattering. Therefore, in the radiation position detector 10 and the PET device 1, the signal processing circuit 16 determines whether or not a sum of the energies of the scintillation light V is equal to or greater than a predetermined value (that is, performs energy discrimination), as described above. Accordingly, it is possible to perform calculation after a signal for the Cherenkov light C is excluded in a case in which there is concern that a noise component is included in the Cherenkov light C, based on the energy of the scintillation light V. As a result, it is possible to improve an S/N ratio of data such as information on the position at which the pixels 21b have detected the Cherenkov light C.

In the radiation position detector 10 and the PET device 1, the control unit 15 obtains the generation position Q of the Cherenkov light C using the propagation locus CT of the Cherenkov light C when the photoelectrons D are emitted from K shells of atoms which most readily cause a photoelectric effect among atoms constituting the medium. The emission angle $\theta_c$ of the Cherenkov light C is determined by a refractive index "n" of the medium, an energy of the γ-rays G interacting with the medium, and a binding energy $E_{B,E}$ of the K shells of the atoms that have emitted the photoelectrons D. Therefore, there is no need to consider a plurality of emission angles $\theta_c$ of the Cherenkov light C by assuming that photoelectrons D are emitted from the K shells of the atoms most readily to cause the photoelectric effect.

In the radiation position detector 10 and the PET device 1, the propagation locus CT of the Cherenkov light C has a conical shape centered on the traveling locus DT while the photoelectrons D emitted due to the interaction of the γ-rays G with the medium travel in a straight line. The generation position Q of the Cherenkov light C is a position of an apex of the conical shape. It is possible to uniquely determine the position at which the γ-rays G have interacted with the medium in the radiator 12 by obtaining the position Q of the Cherenkov light C as the position of the apex of the conical shape.

In the radiation position detector 10 and the PET device 1, the control unit 15 obtains the position of the apex of the conical shape based on the ellipse information on the ellipse N to be fitted to the plurality of pixels 21b that have detected the Cherenkov light C. The Cherenkov light C spreads in a conical shape centered on the traveling locus DT of the photoelectrons D. Thus, when the photoelectrons D travel at an angle with respect to the photodetector 20, positions indicated by a plurality of pieces of detected position information are disposed on the locus of the ellipse N. Therefore, it is possible to obtain the position of the apex of the conical shape more accurately by using the information on the ellipse N to be fitted to the plurality of pixels 21b that have actually detected the Cherenkov light C.

Second Embodiment

Figure 7:
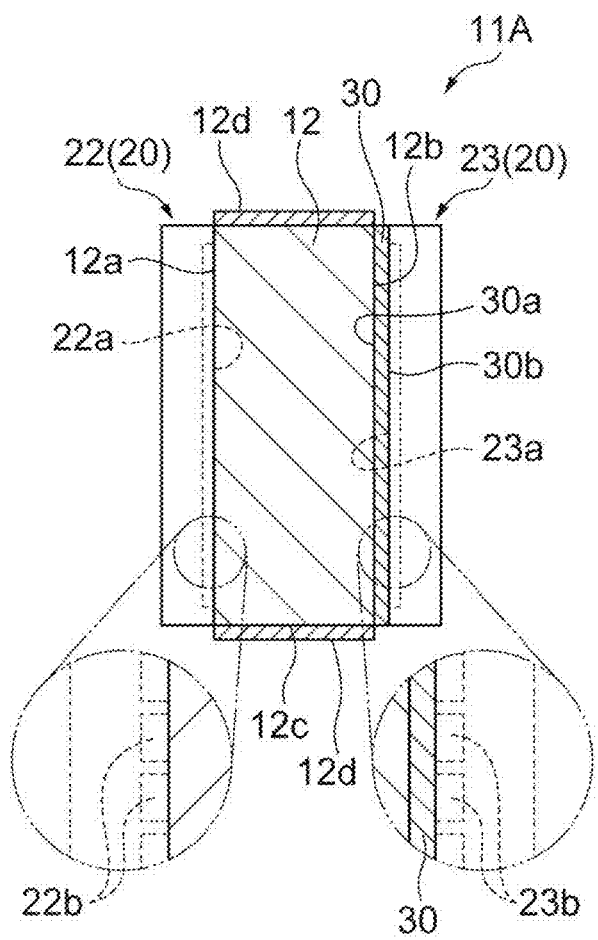
FIG. 7 is a configuration diagram of a radiation position detector according to a second embodiment.

The detection unit 11 of the radiation position detector 10 of the first embodiment can be modified like a detection unit 11A illustrated in FIG. 7. The detection unit 11A includes a first photodetector 23 in place of the first photodetector 21 and is different from the detection unit 11 of the first embodiment in that a filter 30 including a front surface 30a and a back surface 30b is interposed between the first photodetector 23 and the radiator 12. Hereinafter, differences between the second embodiment and the first embodiment will be mainly described, and the same elements or members are denoted by the same reference numerals, and detailed description thereof will be omitted.

The first photodetector 23 is provided on the back surface 12b of the radiator 12 and includes a detection surface 23a in which a plurality of pixels (first pixels) 23b that perform photoelectric conversion are arranged two-dimensionally. The plurality of pixels 23b are disposed to correspond to the back surface 12b of the radiator 12.

The first photodetector 23 has, for example, a sensitivity to the light in the first wavelength region and the light in the second wavelength region. In this case, in order for the first photodetector 23 to detect only the Cherenkov light (the light in the first wavelength region) C without detecting the scintillation light (the light in the second wavelength region) V, the filter 30 is interposed between the back surface 12b of the radiator 12 and the first photodetector 23. The front surface 30a of the filter 30 is disposed to face the back surface 12b of the radiator 12. The back surface 30b of the filter 30 is disposed to face the detection surface 23a. The filter 30 cuts the light in the second wavelength region.

Therefore, the first photodetector 23 detects only the Cherenkov light C without detecting the scintillation light V by detecting the light in the first wavelength region after the light in the second wavelength region is cut by the filter 30. A principle of specifying the generation position Q of the Cherenkov light C and the process of the control unit 15 are the same as those in the first embodiment.

According to the radiation position detector 10 of the second embodiment including such a detection unit 11A, it is possible to accurately specify the position and the time at which the γ-rays G interact with the medium inside the radiator 12, as in the first embodiment.

It should be noted that in the radiation position detector 10 of the second embodiment, a photodetector that is same as the first photodetector 23 may be used as the second photodetector in place of the second photodetector 22. In this case, in order for the second photodetector to detect only the scintillation light V without detecting the Cherenkov light C, a filter that cuts the light in the first wavelength region may be interposed between the front surface 12a of the radiator 12 and the second photodetector. Alternatively, when a small influence on energy discrimination in which the energy of the Cherenkov light C is lower than the energy of the scintillation light V is conceivable, the filter that cuts the light in the first wavelength region may not be interposed between the front surface 12a of the radiator 12 and the second photodetector.

When the first photodetector 21 of the first embodiment is used as the first photodetector and the same photodetector as the first photodetector 23 is used as the second photodetector, a filter that cuts the light in the first wavelength region may be interposed between the front surface 12a of the radiator 12 and the second photodetector instead of the filter 30 being interposed between the back surface 12b of the radiator 12 and the first photodetector 23.

Third Embodiment

Figure 8B:
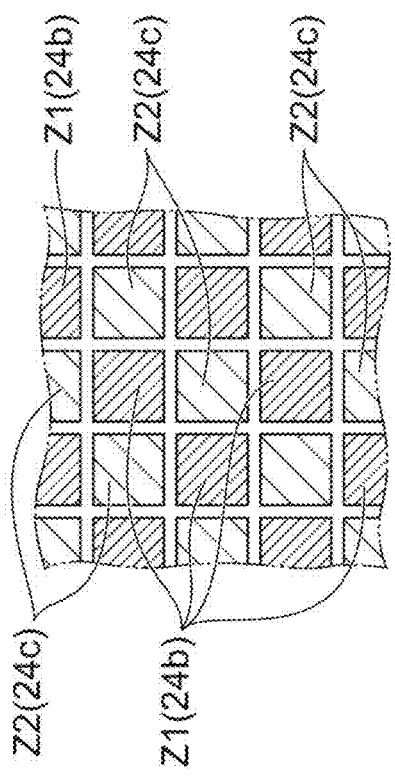
FIG. 8B is a configuration diagram of a radiation position detector according to a third embodiment.
Figure 8A:
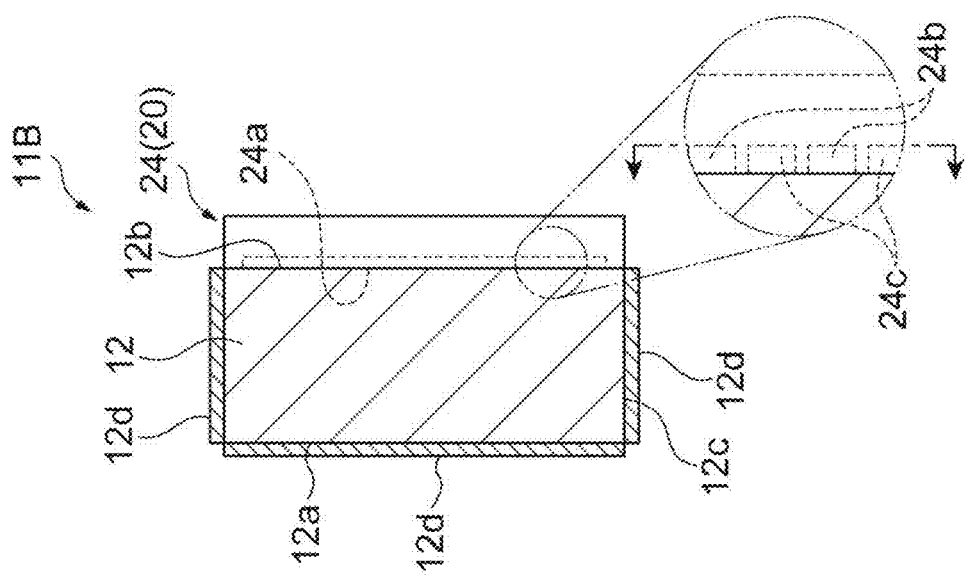
FIG. 8A is a configuration diagram of a radiation position detector according to a third embodiment.

The detection unit 11 in the radiation position detector 10 of the first embodiment can be modified like a detection unit 11B illustrated in FIG. 8A and FIG. 8B. The detection unit 11B is different from the detection unit 11 of the first embodiment in that the detection unit 11B includes a photodetector 24 in place of the first photodetector 21 and the second photodetector 22. Hereinafter, differences between the third embodiment and the first embodiment will be mainly described, and the same elements or members are denoted by the same reference numerals, and detailed description thereof will be omitted.

The photodetector 24 is provided on the back surface (a predetermined surface) 12b of the radiator 12, and includes a plurality of pixels (first pixels) 24b and a plurality of pixels (second pixels) 24c that perform photoelectric conversion. The photodetector 24 includes a detection surface 24a in which a plurality of pixels 24b and a plurality of pixels 24c are arranged two-dimensionally. The photodetector 24 is coupled to the radiator 12 so that the back surface 12b of the radiator 12 and the detection surface 24a face each other. It should be noted that a light absorption layer 12d is provided on the front surface 12a and the side surface 12c that are outer surfaces other than the back surface 12b of the radiator 12.

The plurality of pixels 24b and the plurality of pixels 24c are disposed along the back surface 12b of the radiator 12. In the back surface 12b, a first pixel zone Z1 including one of the pixels 24b and a second pixel zone Z2 including one of the pixels 24c are alternately arranged. The pixels are disposed along the back surface 12b of the radiator 12. The first pixel zone Z1 and the second pixel zone Z2 are disposed, for example, in a checkered pattern. The first pixel zone Z1 and the second pixel zone Z2 are not limited thereto. Various dispositions can be adopted as long as the first pixel zone Z1 and the second pixel zone Z2 are alternately disposed.

The pixel 24b has a sensitivity only to the light in the first wavelength region, and detects only the Cherenkov light C without detecting the scintillation light V. In this case, it is unnecessary for a filter that cuts light in a wavelength region other than the first wavelength region to be provided in a portion of the pixels 24b in the photodetector 24.

The pixel 24c has, for example, sensitivity only to the light in the second wavelength region and detects only the scintillation light V without detecting the Cherenkov light C. In this case, it is unnecessary a filter that cuts light in a wavelength region other than the second wavelength region to be provided in the portion of the pixels 24c in the photodetector 24.

Therefore, the detection unit 11B has both of a function of the first photodetector and a function of the second photodetector, and detects the scintillation light V and the Cherenkov light C. A principle of specifying the generation position Q of the Cherenkov light C and the process of the control unit 15 are the same as those in the first embodiment.

According to such a radiation position detector 10 of the third embodiment, it is possible to accurately specify the position and the time at which the γ-rays G interact with the medium inside the radiator 12, as in the first embodiment. Further, in the detection unit 11B, the plurality of pixels 24b and the plurality of pixels 24c are disposed along the back surface 12b of the radiator 12 so that the first pixel zone Z1 comprising at least one of the pixels 24b and the second pixel zone Z2 including at least one of the pixels 24c are alternately arranged. Accordingly, since the photodetectors 24 (the first photodetector and the second photodetector) are aggregated on one side of the radiator 12 (the back surface 12b side herein), it is possible to simplify, for example, handling of wirings.

It should be noted that in the radiation position detector 10 of the third embodiment, the photodetector 24 may be modified so that one of the pixels 24c is included in the first pixel zone Z1 and one of the pixels 24b is included in the second pixel zone Z2.

Fourth Embodiment

The detection unit 11B in the radiation position detector 10 of the third embodiment can be modified like a detection unit 11C illustrated in FIG. 9A, FIG. 9B and FIG. 9C. The detection unit 11C is different from the detection unit 11B of the third embodiment in that the detection unit 11C includes a photodetector 25 in place of the photodetector 24. Hereinafter, differences between the fourth embodiment and the third embodiment will be mainly described, and the same elements or members are denoted by the same reference numerals, and detailed description thereof will be omitted.

The photodetector 25 is provided on the back surface (a predetermined surface) 12b of the radiator 12, and includes a plurality of pixels (first pixels) 25b and a plurality of pixels (second pixels) 25c that perform photoelectric conversion. The photodetector 25 includes a detection surface 25a in which a plurality of pixels 25b and a plurality of pixels 25c are arranged two-dimensionally. The photodetector 25 is coupled to the radiator 12 so that the back surface 12b of the radiator 12 and the detection surface 25a face each other. It should be noted that a light absorption layer 12d is provided on the front surface 12a and the side surface 12c that are outer surfaces other than the back surface 12b of the radiator 12.

The plurality of pixels 25b and the plurality of pixels 25c are disposed along the back surface 12b of the radiator 12. In the back surface 12b, a first pixel zone Z1 including a plurality of the pixels 25b and a second pixel zone Z2 including one of the pixels 25c are alternately arranged. The pixels are disposed along the back surface 12b of the radiator 12. The pixels 25b are disposed, for example, in a matrix in the first pixel zone Z1. The disposition of the pixels 25b in the first pixel zone Z1 is not limited thereto. The first pixel zone Z1 and the second pixel zone Z2 are disposed, for example, in a checkered pattern. The first pixel zone Z1 and the second pixel zone Z2 are not limited thereto. Various dispositions can be adopted as long as the first pixel zone Z1 and the second pixel zone Z2 are alternately disposed.

The pixel 25b has a sensitivity only to the light in the first wavelength region, and detects only the Cherenkov light C without detecting the scintillation light V. In this case, it is unnecessary for a filter that cuts light in a wavelength region other than the first wavelength region to be provided in a portion of the pixels 25b in the photodetector 25. As illustrated in FIG. 9B and FIG. 9C, the pixel 25b is smaller than the pixel 25c. The pixel 25b includes, for example, a light reception surface having a size of approximately 1/16 of the pixel 25c. The pixel 25b is not limited thereto and can have various sizes in a range in which the pixel 25b has a sensitivity only to the light in the first wavelength region as long as the pixel 25b is smaller than the pixel 25c.

The pixel 25c has, for example, sensitivity only to the light in the second wavelength region and detects only the scintillation light V without detecting the Cherenkov light C. In this case, it is unnecessary a filter that cuts light in a wavelength region other than the second wavelength region to be provided in the portion of the pixels 25c in the photodetector 25.

Therefore, the detection unit 11C has both of a function of the first photodetector and a function of the second photodetector, and detects the scintillation light V and the Cherenkov light C. A principle of specifying the generation position Q of the Cherenkov light C and the process of the control unit 15 are the same as those in the third embodiment.

According to such a radiation position detector 10 of the fourth embodiment, it is possible to accurately specify the position and the time at which the v-rays G interact with the medium inside the radiator 12, as in the third embodiment. Further, in the detection unit 11C, the plurality of pixels 25b and the plurality of pixels 25c are disposed along the back surface 12b of the radiator 12 so that the first pixel zone Z1 comprising at least one of the pixels 25b and the second pixel zone Z2 including at least one of the pixels 25c are alternately arranged. Accordingly, since the photodetectors 25 (the first photodetector and the second photodetector) are aggregated on one side of the radiator 12 (the back surface 12b side herein), it is possible to simplify, for example, handling of wirings. In addition, since the size of the pixel 25c is greater than a size of the pixel 25b, the number of the pixels 25c is smaller than the number of the pixels 25b on the detection surface 25a. As a result, it is possible to reduce the number of readout channels of the pixel 25c relative to the number of readout channels of the pixel 25b.

It should be noted that in the radiation position detector 10 of the fourth embodiment, the photodetector 25 may be modified so that one of the pixels 25b is included in the first pixel zone Z1 and a plurality of pixels 25c are included in the second pixel zone Z2. In this case, it is possible to reduce the number of readout channels of the pixel 25b relative to the number of readout channels of the pixel 25c.

Fifth Embodiment

The detection unit 11B in the radiation position detector 10 of the third embodiment can be modified like a detection unit 11D illustrated in FIG. 10A and FIG. 10B. The detection unit 11D is different from the detection unit 11B of the third embodiment in that the detection unit 11D includes a photodetector 26 in place of the photodetector 24. Hereinafter, differences between the fifth embodiment and the third embodiment will be mainly described, and the same elements or members are denoted by the same reference numerals, and detailed description thereof will be omitted.

The photodetector 26 is provided on the back surface (a predetermined surface) 12b of the radiator 12, and includes a plurality of pixels (first pixels) 26b and a plurality of pixels (second pixels) 26c that perform photoelectric conversion. The photodetector 26 includes a detection surface 26a in which a plurality of pixels 26b and a plurality of pixels 26c are arranged two-dimensionally. The photodetector 26 is coupled to the radiator 12 so that the back surface 12b of the radiator 12 and the detection surface 26a face each other. It should be noted that a light absorption layer 12d is provided on the front surface 12a and the side surface 12c that are outer surfaces other than the back surface 12b of the radiator 12.

The plurality of pixels 26b and the plurality of pixels 26c are disposed along the back surface 12b of the radiator 12. In the back surface 12b, a first pixel zone Z1 including one of the pixels 26b and a second pixel zone Z2 including one of the pixels 26c are alternately arranged. The first pixel zone Z1 and the second pixel zone Z2 are disposed, for example, in a checkered pattern. The first pixel zone Z1 and the second pixel zone Z2 are not limited thereto. Various dispositions can be adopted as long as the first pixel zone Z1 and the second pixel zone Z2 are alternately disposed.

The pixel 26b has, for example, a sensitivity to light in the first wavelength region and light in the second wavelength region. In this case, in order for the pixels 26b to detect only the Cherenkov light (the light in the first wavelength region) C without detecting the scintillation light (the light in the second wavelength region) V, the filter 31 is interposed between the back surface 12b of the radiator 12 and the photodetector 26. A front surface 31a of the filter 31 is disposed to face the back surface 12b of the radiator 12. A back surface 31b of the filter 31 is disposed to face the detection surface 26a. The filter 31 includes a plurality of filter elements 31c that cut the light in the second wavelength region. The plurality of filter elements 31c are disposed at positions corresponding to the positions of the pixels 26b on the detection surface 26a. In the pixel 26b, the photodetector 26 detects only the Cherenkov light C without detecting the scintillation light V by detecting the light in the first wavelength region after the light in the second wavelength region is cut by the filter 31.

The pixel 26c has, for example, sensitivity only to the light in the second wavelength region and detects only the scintillation light V without detecting the Cherenkov light C. In this case, it is unnecessary a filter that cuts light in a wavelength region other than the second wavelength region to be provided in the portion of the pixels 26c in the photodetector 26.

Therefore, the detection unit 11D has both of a function of the first photodetector and a function of the second photodetector, and detects the scintillation light V and the Cherenkov light C. A principle of specifying the generation position Q of the Cherenkov light C and the process of the control unit 15 are the same as those in the third embodiment.

According to such a radiation position detector 10 of the fifth embodiment, it is possible to accurately specify the position and the time at which the γ-rays G interact with the medium inside the radiator 12, as in the third embodiment. Further, in the detection unit 11D, the plurality of pixels 26b and the plurality of pixels 26c are disposed along the back surface 12b of the radiator 12. In the back surface 12b, the first pixel zone Z1 including at least one of the pixels 26b and the second pixel zone Z2 including at least one of the pixels 26c are alternately arranged. Accordingly, since the photodetectors 26 (the first photodetector and the second photodetector) are aggregated on one side of the radiator 12 (the back surface 12b side herein), it is possible to simplify, for example, handling of wirings.

It should be noted that in the radiation position detector 10 of the fifth embodiment, the pixel 26c may be sensitive to the light in the first wavelength region and the light in the second wavelength region. In this case, in order for the photodetector 26 to detect only the scintillation light V without detecting the Cherenkov light C in the pixel 26c, a filter element that cuts the light in the first wavelength region may be disposed at a position corresponding to the position of the pixel 26c. Alternatively, when a small influence on energy discrimination in which the energy of the Cherenkov light C is lower than the energy of the scintillation light V is conceivable, the filter element that cuts the light in the first wavelength region may not be disposed at a position corresponding to the position of the pixel 26c.

In addition, when the pixel 26b has a sensitivity only to the light in the first wavelength region and the pixel 26c has a sensitivity to the light in the first wavelength region and the light in the second wavelength region, a filter element that cuts the light in the first wavelength region may be disposed at a position corresponding to the position of the pixel 26c, instead of disposing the filter element that cuts light in a wavelength region other than the first wavelength region at the position corresponding to the position of the pixel 26b.

Sixth Embodiment

The detection unit 11D of the radiation position detector 10 of the fifth embodiment can be modified like the detection unit 11E illustrated in FIG. 11A, FIG. 11B and FIG. 11C. A detection unit 11E is different from the detection unit 11D of the fifth embodiment in that the detection unit 11E includes a photodetector 27 in place of the photodetector 26. Hereinafter, differences between the sixth embodiment and the fifth embodiment will be mainly described, and the same elements or members are denoted by the same reference numerals, and detailed description thereof will be omitted.

The photodetector 27 includes a plurality of pixels (first pixels) 27b that perform photoelectric conversion and a plurality of pixels (second pixels) 27c. The photodetector 27 includes a detection surface 27a in which a plurality of pixels 27b and pixels 27c are arranged two-dimensionally. The plurality of pixels 27b and the plurality of pixels 27c are disposed along the back surface 12b of the radiator 12. A first pixel zone Z1 including a plurality of pixels 27b and a second pixel zone Z2 including one of the pixels 27c are alternately arranged. The pixels 27b are disposed, for example, in a matrix in the first pixel zone Z1. The disposition of the pixel 27b in the first pixel zone Z1 is not limited thereto. The first pixel zone Z1 and the second pixel zone Z2 are arranged, for example, in a checkered pattern. The first pixel zone Z1 and the second pixel zone Z2 are not limited thereto. Various dispositions can be adopted as long as the first pixel zone Z1 and the second pixel zone Z2 are alternately disposed.

As illustrated in FIG. 11B and FIG. 11C, the pixel 27b is smaller than the pixel 27c. The pixel 27b includes, for example, a light reception surface having approximately 1/16 of a size of the pixel 27c. The pixel 27b is not limited thereto and can have various sizes in a range in which the pixel 27b has a sensitivity only to the light in the first wavelength region as long as the pixel 27b is smaller than the pixel 27c.

The pixel 27b has, for example, a sensitivity to light in the first wavelength region and light in the second wavelength region. In this case, in order for the pixels 27b to detect only the Cherenkov light (the light in the first wavelength region) C without detecting the scintillation light (the light in the second wavelength region) V, the filter 31 is interposed between the back surface 12b of the radiator 12 and the photodetector 27. A back surface 31b of the filter 31 is disposed to face the detection surface 27a. The filter 31 includes a plurality of filter elements 31c that cut the light in the second wavelength region. The plurality of filter elements 31c are disposed at positions corresponding to the positions of the pixels 27b on the detection surface 27a. In the pixel 27b, the photodetector 27 detects only the Cherenkov light C without detecting the scintillation light V by detecting the light in the first wavelength region after the light in the second wavelength region is cut by the filter 31.

The pixel 27c has, for example, sensitivity only to the light in the second wavelength region and detects only the scintillation light V without detecting the Cherenkov light C. In this case, it is unnecessary a filter that cuts light in a wavelength region other than the second wavelength region to be provided in the portion of the pixels 27c in the photodetector 27.

Therefore, the detection unit 11E has both of a function of the first photodetector and a function of the second photodetector, and detects the scintillation light V and the Cherenkov light C. A principle of specifying the generation position Q of the Cherenkov light C and the process of the control unit 15 are the same as those in the fifth embodiment.

According to such a radiation position detector 10 of the sixth embodiment, it is possible to accurately specify the position and the time at which the γ-rays G interact with the medium inside the radiator 12, as in the fifth embodiment. Further, in the detection unit 11E, the plurality of pixels 27b and the plurality of pixels 27c are disposed along the back surface 12b of the radiator 12 so that the first pixel zone Z1 comprising at least one of the pixels 27b and the second pixel zone Z2 including at least one of the pixels 27c are alternately arranged. Accordingly, since the photodetectors 27 (the first photodetector and the second photodetector) are aggregated on one side of the radiator 12 (the back surface 12b side herein), it is possible to simplify, for example, handling of wirings. In addition, since the size of the pixel 27c is greater than a size of the pixel 27b, the number of the pixels 27c is smaller than the number of the pixels 27b on the detection surface 27a. As a result, it is possible to reduce the number of readout channels of the pixel 27c relative to the number of readout channels of the pixel 27b.

It should be noted that in the radiation position detector 10 of the sixth embodiment, the photodetector 27 may be modified so that one of the pixels 27b is included in the first pixel zone Z1 and a plurality of pixels 27c are included in the second pixel zone Z2. In this case, it is possible to reduce the number of readout channels of the pixel 27b relative to the number of readout channels of the pixel 27c.

Further, the pixel 27c may be sensitive to the light in the first wavelength region and the light in the second wavelength region. In this case, in order for the photodetector 27 to detect only the scintillation light V without detecting the Cherenkov light C in the pixel 27c, a filter element that cuts the light in the first wavelength region may be disposed at a position corresponding to the position of the pixel 27c. Alternatively, when a small influence on energy discrimination in which the energy of the Cherenkov light C is lower than the energy of the scintillation light V is conceivable, the filter element that cuts the light in the first wavelength region may not be disposed at a position corresponding to the position of the pixel 27c.

In addition, when the pixel 27b has a sensitivity only to the light in the first wavelength region and the pixel 27c has a sensitivity to the light in the first wavelength region and the light in the second wavelength region, a filter element that cuts the light in the first wavelength region may be disposed at a position corresponding to the position of the pixel 27c, instead of disposing the filter element that cuts light in a wavelength region other than the first wavelength region at the position corresponding to the position of the pixel 27b.

The present invention is not limited to the above embodiment. For example, although the example in which the centroid position of the energy distribution is used as a method of determining which of the two generation positions on one side and the other side in the major axis direction of the ellipse N is the generation position is shown, other schemes may be used. For example, the generation position Q in an area in which the number of photons on the circumference of the ellipse N is larger may be specified as the actual generation position.

Further, an example of the medium constituting the radiator 12 includes the BGO, but the medium is not limited thereto. Materials other than the above may be used as the radiator 12 in consideration of a refractive index, a density, or the like according to an energy of the radiation that is a detection target.

In addition, an example in which the radiation position detector is used for the PET device has been described, but the present invention is not limited thereto. The radiation position detector may be used for a TOF-PET device since time fluctuation with respect to light emission does not substantially occur.

For the light absorption layer 12d, for example, when the radiator 12 is sufficiently wide in a flat shape relative to the spread of the Cherenkov light C to be emitted, the light absorption layer 12d of the side surface 12c can be omitted without consideration of reflection of light by the side surface 12c.

Further, although the γ-ray G is exemplified as the radiation, other types of radiation may be used. The light in the first wavelength region is the Cherenkov light and the light in the second wavelength region is the scintillation light, but the light in the first wavelength region and the light in the second wavelength region are not limited thereto. Further, in the radiator 12, the plurality of first pixels are disposed along the back surface 12b, but the plurality of first pixels may be arranged along the front surface 12a or the side surface 12c. Although the plurality of second pixels are disposed along the front surface 12a or the back surface 12b, the plurality of second pixels may be disposed along the side surface 12c. In short, the radiation position detector may include a radiator including a medium that generates light in a first wavelength region and light in a second wavelength region by interacting with incident radiation, a first photodetector that includes a plurality of first two-dimensionally arranged pixels and detects the light in the first wavelength region, and a second photodetector that includes a plurality of second two-dimensionally arranged pixels and detects the light in the second wavelength region.

Further, the control unit 15 of the first embodiment can obtain the generation position Q of the Cherenkov light C (that is, the generation position of the photoelectron D and the interaction position of the γ-ray G) (hereinafter referred to as a "first coordinate determination process") as will be described below. FIG. 12A and FIG. 12B are schematic diagrams illustrating another aspect of the Cherenkov light that is emitted inside the radiator 12. In FIG. 12A, the radiator 12 is schematically illustrated in a cross-sectional view, and in FIG. 12B, the first photodetector 21 is schematically illustrated in a plan view.

First, the control unit 15 obtains a position of a centroid A with respect to positions S of the plurality of pixels 21b that have detected Cherenkov light C, as illustrated in FIG. 12B. The position of the centroid A in an X-axis direction and a Y-axis direction parallel to the back surface 12b of the radiator 12 (that is, an X coordinate $X_{cm}$ and a Y coordinate $Y_{cm}$ of the centroid A) can be obtained using Equation (11) below. Here, N is the number of the plurality of pixels 21b that have detected the Cherenkov light C, $E_i$ is a detection energy of the "i"th photon, and $x_i$ and $y_i$ are the X coordinate and the Y coordinate of the pixel 21b that has detected the "i"th photon, respectively.

[Math. 11]

$$X_{cm} = \frac{1}{N} \sum_{i=0}^{N} E_i x_i \qquad (11)$$

$$Y_{cm} = \frac{1}{N} \sum_{i=0}^{N} E_i y_i$$

Subsequently, the control unit 15 obtains an ellipse N centered on the centroid A, which is an ellipse N to be fitted to the positions S of the plurality of pixels 21b that have detected the Cherenkov light C. The control unit 15 obtains the position of the apex of the conical shape, which is the propagation locus of the Cherenkov light C, based on ellipse information on the ellipse N. Here, the control unit 15 obtains the position of the apex of the conical shape in the Z-axis direction perpendicular to the back surface 12b of the radiator 12 (that is, a Z coordinate of the apex of the conical shape).

Subsequently, the control unit 15 sets the X coordinate $X_{cm}$ and the Y coordinate $Y_{cm}$ of the centroid A as the generation position Q of the Cherenkov light C in the X-axis direction and the Y-axis direction (that is, the X coordinate and the Y coordinate of the generation position of the Cherenkov light C), and sets the Z coordinate of the apex of the conical shape as the generation position Q of the Cherenkov light C in the Z-axis direction (that is, the Z coordinate of the generation place of the Cherenkov light C).

Even through the first coordinate determination process described above, it is possible to accurately specify the position and the time at which the γ ray G interacts with the medium in the radiator 12. Such specifying of the generation position Q is particularly effective when the photoelectrons D emitted due to the interaction of the γ ray G with the medium do not go straight, as illustrated in FIG. 12A.

Figure 13:
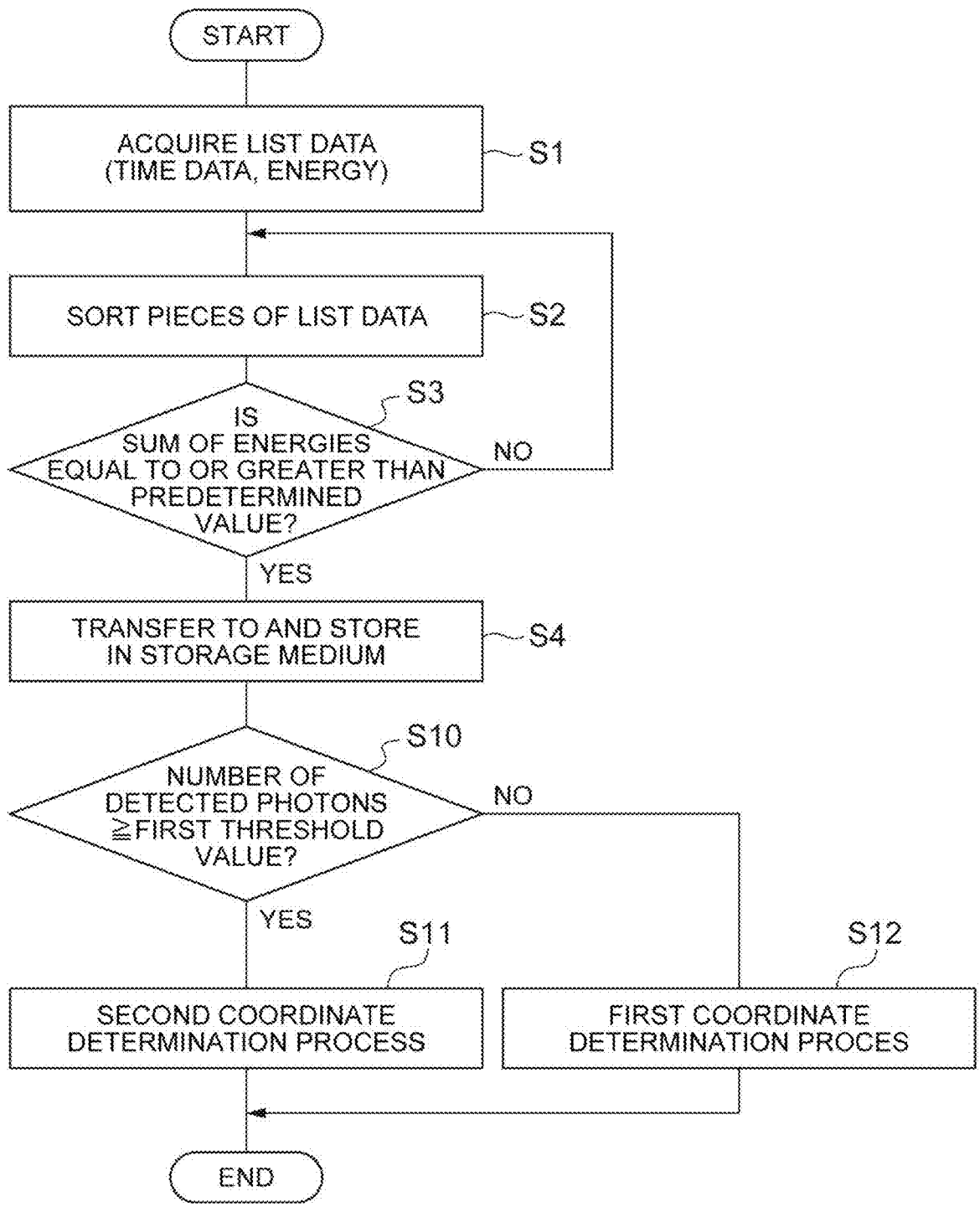
FIG. 13 is a flowchart showing another aspect of a process flow for specifying the interaction position in the control unit of the first embodiment.

Further, the control unit 15 can perform the first coordinate determination process described above or the second coordinate determination process corresponding to steps S5 to S9 in FIG. 6 according to the number of detected photons of the first photodetector 21, as will be described below. FIG. 13 is a flowchart showing another aspect of the process flow for specifying the interaction position in the control unit 15 of the first embodiment. It should be noted that although the case of the first embodiment will be described below, the same applies to the case of the second embodiment, the third embodiment, the fourth embodiment, the fifth embodiment, and the sixth embodiment.

First, the signal processing circuit 16 acquires the list data output from each pixel 21b of the first photodetector 21 and the pixel 22b of the second photodetector 22 (step S1). The list data includes time info Illation indicating a time at which the pixel 21b has detected the Cherenkov light C, a segment address indicating a position of the pixel 21b, time information indicating a time at which the pixel 22b has detected the scintillation light V, a segment address indicating a position of the pixel 22b, and the information on the amount of the scintillation light V. The signal processing circuit 16 obtains the energy of the scintillation light V based on the acquired information on the amount of the scintillation light V.

The signal processing circuit 16 sorts the acquired plurality of pieces of list data based on the time information (step S2). The signal processing circuit 16 acquires the list data group that falls within the time window from the sorted list data, and determines whether a sum of energies of the scintillation light V in the pieces of list data constituting the acquired list data group is equal to or greater than a predetermined value (step S3). That is, the signal processing circuit 16 executes energy discrimination. In this case, a difference between the pieces of time information of the respective pieces of list data constituting the list data group falls within the time width of the time window. When the sum of energies of the scintillation light V in the pieces of list data constituting the list data group is equal to or greater than the predetermined value in step S3, these pieces of list data are transferred to the storage medium 17 and stored in the storage medium 17 (step S4). Further, when the sum of energies of the scintillation light V in the pieces of list data constituting the list data group is smaller than the predetermined value, these pieces of list data are processed as invalid data. In this case, the generation position Q of the Cherenkov light C is not obtained. For example, the predetermined value in step S3 may be a value of an energy with which events such as inter-crystal scattering and intra-subject scattering, which become noise components when the pixel 21b detects the Cherenkov light C, can be removed. In addition, the list data may be determined to be invalid data when the sum of the energies of the scintillation light V is smaller than an energy corresponding to a case in which the interaction is a photoelectric effect (for example, when the interaction is Compton scattering).

Subsequently, the calculation circuit 18 determines whether or not the number of detected photons (that is, the number of the plurality of pixels 21b that have detected the Cherenkov light C) is equal to or greater than a first threshold value (step S10). When the number of photons detected by the first photodetector 21 is equal to or greater than the first threshold value in step S10, the calculation circuit 18 performs a second coordinate determination process corresponding to steps S5, S6, S7, S8, and S9 in FIG. 6 (step S11). In step S10, when the number of detected photons is smaller than the first threshold value, the calculation circuit 18 performs the first coordinate determination process described above (step S12).

REFERENCE SIGNS LIST

1 PET device
10 Radiation position detector
12 Radiator (medium)
12a Front surface (second surface)
12b Back surface (predetermined surface, first surface)

15 Control unit
20 Photodetector
21 First photodetector
21b Pixel (first pixel)
22 Second photodetector
22b Pixel (second pixel)
23 First photodetector
23b Pixel (first pixel)
24 Photodetector (first photodetector, second photodetector)
24b Pixel (first pixel)
24c Pixel (second pixel)
25 Photodetector (first photodetector, second photodetector)
25b Pixel (first pixel)
25c Pixel (second pixel)
26 Photodetector (first photodetector, second photodetector)
26b Pixel (first pixel)
26c Pixel (second pixel)
27 Photodetector (first photodetector, second photodetector)
27b Pixel (first pixel)
27c Pixel (second pixel)
C Cherenkov light (light in first wavelength region)
CT Propagation locus
DT Traveling locus (locus)
G γ-ray (radiation)
N Ellipse
Q Generation position
V Scintillation light (light in second wavelength region)
Z1 First pixel zone
Z2 Second pixel zone

The invention claimed is:

1. A radiation position detector comprising:
a radiator including a medium that generates light in a first wavelength region and light in a second wavelength region by interacting with incident radiation;
a first photodetector that includes a plurality of first pixels arranged two-dimensionally and detects the light in the first wavelength region; and
a second photodetector that includes a plurality of second pixels arranged two-dimensionally and detects the light in the second wavelength region.

2. The radiation position detector according to claim 1, wherein the radiator includes a first surface and a second surface that face each other,
a plurality of first pixels are disposed along the first surface, and
a plurality of second pixels are disposed along the second surface.

3. The radiation position detector according to claim 1, wherein the plurality of first pixels and the plurality of second pixels are disposed along a predetermined surface of the radiator such that a first pixel zone including at least one of the first pixels and a second pixel zone including at least one of the second pixels are alternately arranged.

4. The radiation position detector according to claim 1,
wherein the light in the first wavelength region is Cherenkov light, and
the light in the second wavelength region is scintillation light.

5. The radiation position detector according to claim 4, further comprising:
a control unit configured to acquire position information of the plurality of first pixels that have detected the Cherenkov light and time information thereof based on a signal output from the first photodetector, obtain a generation position and time of the Cherenkov light in the radiator based on the acquired position information, the acquired time information, and a propagation locus of the Cherenkov light in the radiator, and obtain an energy of the scintillation light based on a signal output from the second photodetector.

6. The radiation position detector according to claim 5, wherein the control unit obtains the generation position of the Cherenkov light using the propagation locus of the Cherenkov light when photoelectrons are emitted from a K shell of an atom which most easily causes a photoelectric effect among atoms constituting the medium.

7. The radiation position detector according to claim 5,
wherein the propagation locus of the Cherenkov light has a conical shape centered on a locus of photoelectrons emitted by the radiation interacting with the medium, and
the generation position of the Cherenkov light is a position of an apex of the conical shape.

8. The radiation position detector according to claim 7, wherein the control unit obtains the position of the apex of the conical shape based on ellipse information on an ellipse to be fitted to the plurality of first pixels that have detected the Cherenkov light.

9. A PET device comprising the radiation position detector according to claim 1.

* * * * *